US012584942B1

(12) United States Patent
Noh et al.

(10) Patent No.: US 12,584,942 B1
(45) Date of Patent: Mar. 24, 2026

(54) MEASUREMENT SYSTEM WITH DETECTION MECHANISM AND METHOD OF OPERATION THEREOF

(71) Applicant: Park Systems Corp., Suwon (KR)

(72) Inventors: Hanaul Noh, Mountain View, CA (US); Chih-Chieh Hsieh, San Jose, CA (US); Myunghoon Choi, Santa Clara, CA (US); Stefan Kaemmer, Santa Barbara, CA (US)

(73) Assignee: Park Systems Corp., Suwon (KR)

( * ) Notice: Subject to any disclaimer, the term of this patent is extended or adjusted under 35 U.S.C. 154(b) by 0 days.

(21) Appl. No.: 19/384,994

(22) Filed: Nov. 10, 2025

(51) Int. Cl.
| | |
|---|---|
| *G01Q 60/40* | (2010.01) |
| *G01N 22/00* | (2006.01) |
| *G01N 27/02* | (2006.01) |
| *G01Q 60/34* | (2010.01) |

(52) U.S. Cl.
CPC ............. *G01Q 60/40* (2013.01); *G01N 22/00* (2013.01); *G01Q 60/34* (2013.01)

(58) Field of Classification Search
CPC ........ G01Q 60/40; G01Q 60/34; G01N 22/00; G01N 27/02
See application file for complete search history.

(56) References Cited

U.S. PATENT DOCUMENTS

| | | | |
|---|---|---|---|
| 8,266,718 | B2 | 9/2012 | Lai et al. |
| 8,307,461 | B2 | 11/2012 | Li et al. |
| 8,661,560 | B1 | 2/2014 | Li et al. |
| 9,213,047 | B2 | 12/2015 | Li et al. |
| 9,291,640 | B2 | 3/2016 | Su et al. |
| 9,322,842 | B2 | 4/2016 | Hu et al. |
| 10,060,862 | B2 | 8/2018 | Cui et al. |
| 10,228,388 | B2 | 3/2019 | Prater et al. |
| 10,274,513 | B2 | 4/2019 | Friedman et al. |
| 10,473,694 | B2 | 11/2019 | Friedman et al. |
| 2012/0192319 | A1 | 7/2012 | Li et al. |

(Continued)

OTHER PUBLICATIONS

Jun-Yi Shan, Nathaniel Morrison, Su-Di Chen, Feng Wang, Eric Y. Ma, Johnson-noise-limited cancellation-free microwave impedance microscopy with monolithic silicon cantilever probes; pp. 1-8; Nature Communications, Published online Jun. 13, 2024; 201 The Author(s) 2024; https://doi.org/10.1038/s41467-024-49405-8.

(Continued)

*Primary Examiner* — Neel D Shah
(74) *Attorney, Agent, or Firm* — Perspectives Law Group, Corp.

(57) ABSTRACT

A method of operation of a measurement system includes: generating a microwave excitation towards a sample; scanning the sample along a path at a first vertical position relative to the sample; capturing a first microwave response along the path at the first vertical position based on the microwave excitation; generating a first channel voltage based on the first microwave response; scanning the sample along the path at a second vertical position relative to the sample; capturing a second microwave response along the path at the second vertical position based on the microwave excitation; generating a second channel voltage based on the second microwave response; and determining a voltage difference between the first channel voltage based on the first vertical position and the second channel voltage based on the second vertical position for characterizing the sample.

20 Claims, 6 Drawing Sheets

116 ⌐

(56)  References Cited

U.S. PATENT DOCUMENTS

| | | | |
|---|---|---|---|
| 2013/0276174 A1* | 10/2013 | Li | B82Y 35/00 |
| | | | 850/5 |
| 2014/0230103 A1 | 8/2014 | Su et al. | |
| 2014/0283229 A1 | 9/2014 | Hu et al. | |
| 2017/0299525 A1 | 10/2017 | Cui et al. | |
| 2018/0120344 A1 | 5/2018 | Prater et al. | |
| 2018/0217181 A1* | 8/2018 | Friedman | G01Q 60/30 |
| 2019/0234993 A1 | 8/2019 | Friedman et al. | |

OTHER PUBLICATIONS

Bruker; Scanning Microwave Impedance Microscopy (sMIM); pp. 1-14; © Copyright Bruker 2025 [retrieved on Oct. 30, 2025]. Retrieved from the Internet: https://www.bruker.com/en/products-and-solutions/microscopes/materials-afm/afm-modes/scanning-microwave-impedance-microscopy-smim.html.
Bruker; Performing Hyperspectral Mapping with AFM DataCube Nanoelectrical Modes, pp. 1-36; © Copyright Bruker 2025 [retrieved on Oct. 30, 2025]. Retrieved from the Internet: https://www.bruker.com/en/products-and-solutions/microscopes/materials-afm/resource-library/an152-performing-hyperspectral-mapping-with-afm-datacube-nanoelectrical-modes.html.

* cited by examiner

204

226

310

10~15 μm

114

232
230

TIP-SAMPLE INTERACTION

302

308

NANOSCALE
DIFFERENCE IN HEIGHT

304

STRAY CAPACITANCE
& DRIFT

306

410

Δ SMIM

402

404

LIFTED

406

APPROACHED

408

MEASUREMENT SYSTEM WITH DETECTION MECHANISM AND METHOD OF OPERATION THEREOF

TECHNICAL FIELD

An embodiment of the present invention relates generally to a measurement system, and more particularly to a system with a detection mechanism.

BACKGROUND

In the field of microscopy and material characterization, atomic force microscopy (AFM) and related techniques such as Scanning Microwave Impedance Microscopy (SMIM) can be used to measure surface features and electrical responses of materials. These methods are applied in areas including semiconductor research, materials development, and biological studies to obtain information about physical and electrical characteristics of a sample.

Thus, a need still remains for a measurement system with detection mechanisms that delivers high spatial resolution together with stable, quantitative performance across multiple imaging modes and a range of materials. In view of the ever-increasing commercial competitive pressures, along with growing manufacturing needs, manufacturing expectations, and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a measurement system including: an excitation unit configured to generate a microwave excitation towards a sample; a probe, coupled to the excitation unit, configured to: scan the sample along a path at a first vertical position relative to the sample, capture a first microwave response along the path at the first vertical position based on the microwave excitation, scan the sample along the path at a second vertical position relative to the sample, and capture a second microwave response along the path at the second vertical position based on the microwave excitation; and an impedance detection unit, coupled to the probe, configured to: generate a first channel voltage based on the first microwave response, and generate a second channel voltage based on the second microwave response for determining a voltage difference between the first channel voltage based on the first vertical position and the second channel voltage based on the second vertical position for characterizing the sample.

An embodiment of the present invention provides a method of operation of a measurement system including: generating a microwave excitation towards a sample; scanning the sample along a path at a first vertical position relative to the sample; capturing a first microwave response along the path at the first vertical position based on the microwave excitation; generating a first channel voltage based on the first microwave response; scanning the sample along the path at a second vertical position relative to the sample; capturing a second microwave response along the path at the second vertical position based on the microwave excitation; generating a second channel voltage based on the second microwave response; and determining a voltage difference between the first channel voltage based on the first vertical position and the second channel voltage based on the second vertical position for characterizing the sample.

An embodiment of the present invention provides a non-transitory computer-readable medium storing an instruction that, when executed by a control circuit of a measurement system, causes the control circuit to perform functions including: generating a microwave excitation towards a sample; scanning the sample along a path at a first vertical position relative to the sample; capturing a first microwave response along the path at the first vertical position based on the microwave excitation; generating a first channel voltage based on the first microwave response; scanning the sample along the path at a second vertical position relative to the sample; capturing a second microwave response along the path at the second vertical position based on the microwave excitation; generating a second channel voltage based on the second microwave response; and determining a voltage difference between the first channel voltage based on the first vertical position and the second channel voltage based on the second vertical position for characterizing the sample.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
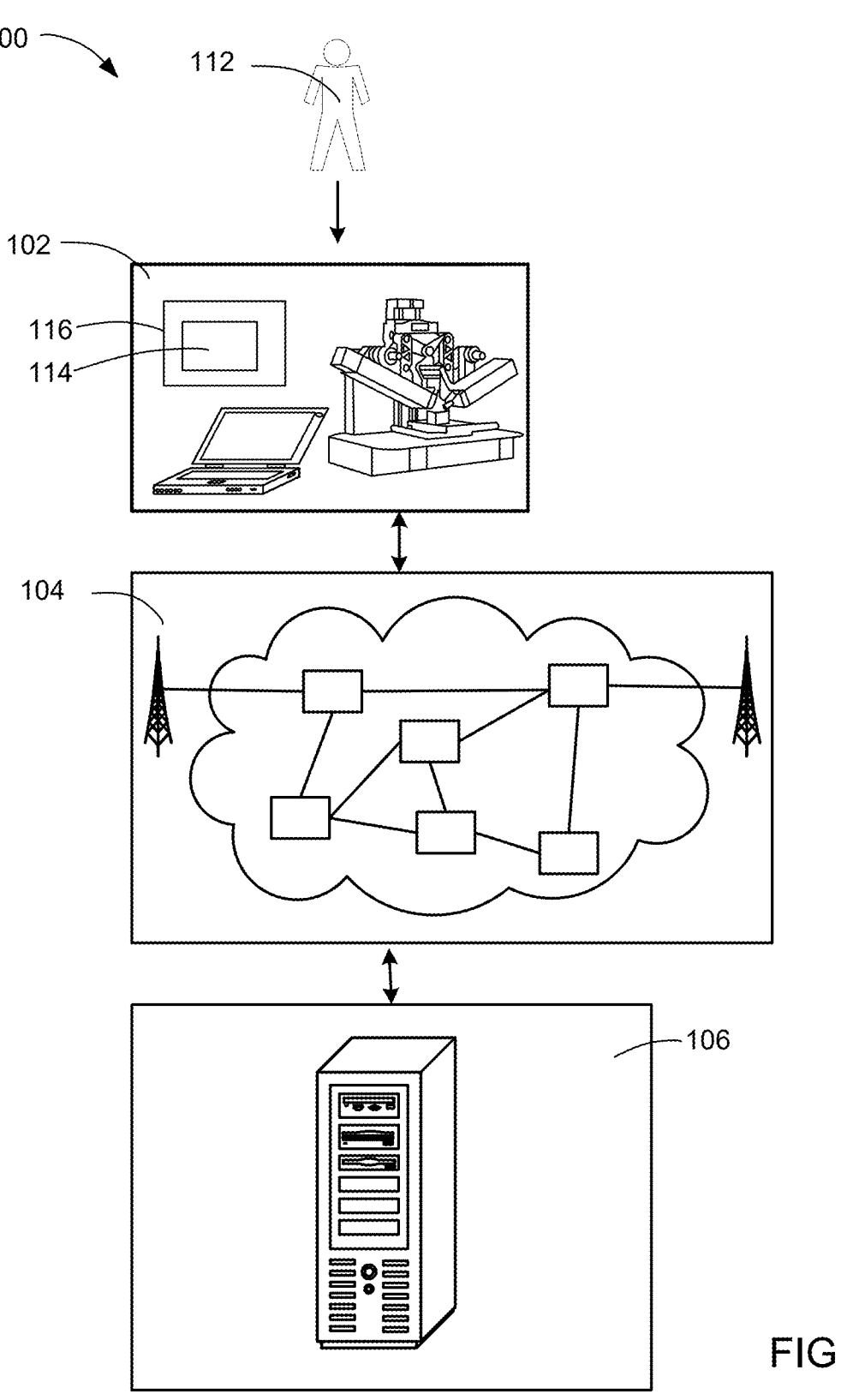
FIG. 1 is an example of a system architectural diagram of a measurement system with a detection mechanism in an embodiment of the present invention.

Description of various embodiments of the present invention is described with an example of development of an atomic force microscope (AFM) system incorporating a Scanning Microwave Impedance Microscopy (SMIM) module that implements real-time differential imaging modes in SMIM, using a probe configured to detect both mechanical and microwave responses of a sample.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments of various components as a matter of descriptive convenience and are not intended to have any other significance or provide limitations for an embodiment of the present invention.

The embodiments can be numbered as first embodiment, second embodiment, etc. or can be described without a numeric designation as a matter of descriptive convenience and are not intended to have any other significance or provide limitations for an embodiment of the present invention. The terms first, second, etc. or without a numeric designation can be used throughout as part of element names and are used as a matter of descriptive convenience and are not intended to have any other significance or provide limitations for an embodiment.

The term "module" or "unit" or "circuit" or "mechanism" referred to herein can include or be implemented as or include software running on specialized hardware, hardware, or a combination thereof in the present invention in accordance with the context in which the term is used. For example, the software can provide instructions and can be implemented as machine code, firmware, embedded code, and application software. The software can also include a function, a call to a function, a code block, or a combination thereof.

Also, for example, the hardware can be gates, circuitry, processor, computer, integrated circuit, integrated circuit cores, memory devices, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a "unit" or a "circuit" is written in the claims section below, the "unit" or the "circuit" is deemed to include hardware circuitry for the purposes and the scope of the claims.

For example, the hardware can include an atomic force microscope (AFM) head assembly, cantilevers or probes with conductive or metal-coated tips, piezoelectric scanners for positioning and feedback control, microwave transmission lines or coaxial feed structures for signal delivery, impedance-matching networks, microwave sources and detectors, low-noise amplifiers, mixers, and demodulators for signal processing, or a combination thereof. Also for example, the hardware can include vibration-isolation platforms, environmental enclosures, signal-conditioning circuits, controller and feedback electronics, lock-in amplifiers, data-acquisition units, or other components for AFM and Scanning Microwave Impedance Microscopy (SMIM) measurements, or a combination thereof.

As a specific example, the excitation sources can include microwave signal generators, vector network analyzers (VNAs), or frequency synthesizers configured to provide continuous-wave or modulated microwave excitations, impedance-matched through transmission lines or couplers to the probe. As another specific example, the excitation sources can include broadband microwave sources, mixers, or oscillators configured for amplitude or frequency modulation, phase control, or impedance calibration, any other microwave excitation sources, or a combination thereof.

The module, units, circuits, or mechanism in the following description of the embodiments can be coupled or attached to one another as described or as shown, as examples. The coupling or attachment can be direct or indirect without or with intervening items between coupled or attached modules or units or circuits or mechanisms. The coupling or attachment can be by physical contact or by communication between modules or units or circuits or mechanisms, such as wireless communication.

It is also understood that the nouns or elements in the embodiments can be described as a singular instance. It is understood that the usage of singular is not limited to singular but the singular usage can be applicable to multiple instances for any particular noun or element in the application. The numerous instances can be the same or similar or can be different.

Referring now to FIG. 1, therein is shown an example of a system architectural diagram of a measurement system 100 with a detection mechanism 116 in an embodiment of the present invention. One or more embodiments address measurement functions of the measurement system 100 as a distributed platform in which exchanges of commands and data with a detection mechanism 116 across a network topology. One or more embodiments address AFM and Scanning Microwave Impedance Microscopy (SMIM) measurement functions of the measurement system 100 as a distributed platform in which commands and data are exchanged among the first device 102, the second device 106, the detection mechanism 116, or a combination thereof over the network 104.

The measurement system 100 can include a first device 102, such as a client or a server, connected to a second device 106, such as a client or server. The first device 102 can communicate with the second device 106 through a network 104, such as a wireless or wired network. For example, the first device 102 that implements the AFM/SMIM instrument and a local controller is connected to the second device 106.

For example, the first device 102 can be of any of a variety of computing devices, such as a measurement equipment, a computer, a notebook computer, or other multi-functional device. Also, for example, the first device 102 can be included in a device or a sub-system. As a specific example, the first device 102 can be an atomic force microscope (AFM) including a Scanning Microwave Impedance Microscopy (SMIM) module or any other scanning probe microscopy instrument.

For example, the first device 102 can function as an atomic force microscope (AFM). As an example, the first device 102 positions a probe or cantilever tip near or in contact with a sample 114, measures the interaction forces between the probe and the sample 114, and detects corresponding deflection or response signals. In an embodiment, the first device 102 includes a SMIM circuit coupled to the probe to apply a microwave excitation to the sample 114 and detect the reflected or transmitted microwave signal from a tip-sample interaction. Also for example, the collected signals can include mechanical response data, SMIM baseband channels (e.g., in-phase and quadrature or capacitance and conductance), impedance data, or a combination thereof, which are processed to produce maps of topography, permittivity, conductivity, or other electrical or material parameters of the sample 114. As an example, data acquisition and image formation can be performed during contact or non-contact scanning modes including off-resonance tapping and/or lift-mode passes. As another example, the second device 106 can perform impedance extraction, data reconstruction, or analysis using signal-processing algorithms, artificial intelligence (AI) models, machine-learning models, or other computational techniques For example, the user 112 supplies the sample 114 to the first device 102 with the detection mechanism 116, and the first device 102 captures response signals from the sample 114 and processes data generated from the signals. The detection mechanism 116 includes AFM scanner and probe-control electronics, feedback circuitry, and SMIM microwave excitation and demodulation circuitry to drive a probe with a mechanical and microwave excitation, detecting responses corresponding to tip-sample interactions, and analyzing the detected responses to determine material and electrical information of the sample 114. As another example, the first device 102 can perform all computations locally or, via the network 104, off-load part of the computation workload or share the local computation results with the second device 106 with a higher processing capacity for additional processing and storage.

For illustrative purposes, the sample 114 is shown in the detection mechanism 116, although it is understood that the sample 114 can be outside of the detection mechanism 116. For example, the sample 114 can be mounted on a stage or chuck of the AFM with a SMIM module or SMIM system and provided to the first device 102 to be characterized or tested.

For illustrative purposes, the detection mechanism 116 is shown in the first device 102, although it is understood that the detection mechanism 116 can be implemented in a different manner. For example, the detection mechanism 116 can be distributed between the first device 102 and the second device 106. Also for example, the first device 102 can include multiple probes and/or multiple instruments that independently operate AFM or SMIM probes for parallel measurements across multiple samples 114, and the collected information for all of the samples 114 can be transferred to the second device 106 for combined analysis or comparison.

The first device 102 can couple, either directly or indirectly, to the network 104 to communicate with the second device 106 or can be a stand-alone device. The first device 102 can further be separated from or incorporated with a smart phone, a tablet computer, a desktop, a laptop computer, a scanner, or other personal electronic devices or can include an embedded controller within the instrument chassis.

The second device 106 can be any of a variety of centralized or decentralized computing devices. For example, the second device 106 can be a computer, workstation, server, grid computing resources, a virtualized computer resource, cloud computing resource, routers, switches, peer-to-peer distributed computing devices, or a combination thereof. In an embodiment, the second device 106 can execute image-processing, impedance-mapping, calibration, or data-classification software for AFM or SMIM datasets.

The second device 106 can be centralized in a single room, distributed across different rooms, distributed across different geographical locations, embedded within a telecommunications network, on-premises, or remote. The second device 106 can couple with the network 104 to communicate with the first device 102. The second device 106 can also be a client type device as described for the first device 102. For example, the second device 106 can receive the SMIM baseband data or AFM deflection signals and perform advanced analysis, visualization, or data storage.

Also, for illustrative purposes, the measurement system 100 is described with the second device 106 as a computing device, although it is understood that the second device 106 can be different types of devices. Also, for illustrative purposes, the measurement system 100 is shown with the second device 106 and the first device 102 as endpoints of the network 104, although it is understood that the measurement system 100 can include a different partition between the first device 102, the second device 106, and the network 104. For example, the first device 102, the second device 106, or a combination thereof can also function as part of the network 104 and host services for instrument control, data streaming, and user interfaces.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

For example, a user 112 can utilize the first device 102 to initiate or supervise a measurement sequence of a sample 114, while the second device 106 can receive sensed measurement information, execute analytical routines, and return processed measurement information to the user 112. As an example, the user 112 can be an operator, a laboratory technician, an engineer, a scientist, or any other users of the measurement system 100. Also as an example, the second device 106 can be implemented as centralized or decentralized computing resources. This partition of control and computation can allow AFM and SMIM measurements to be performed locally while remote or higher-level devices perform impedance analysis, calibration, device health monitoring, or visualization of results.

For example, the second device 106 can host portions of the detection mechanism 116 for executing the analytical routines using the sensed measurement information. As an example, the detection mechanism 116 can include a probe control circuit, feedback electronics, and SMIM detection circuitry including microwave excitation, quadrature demodulation, and impedance-analysis components. Further details for operations, components, and technical aspects of the detection mechanism 116 will be described below in the description of the measurement system 100.

Figure 2:
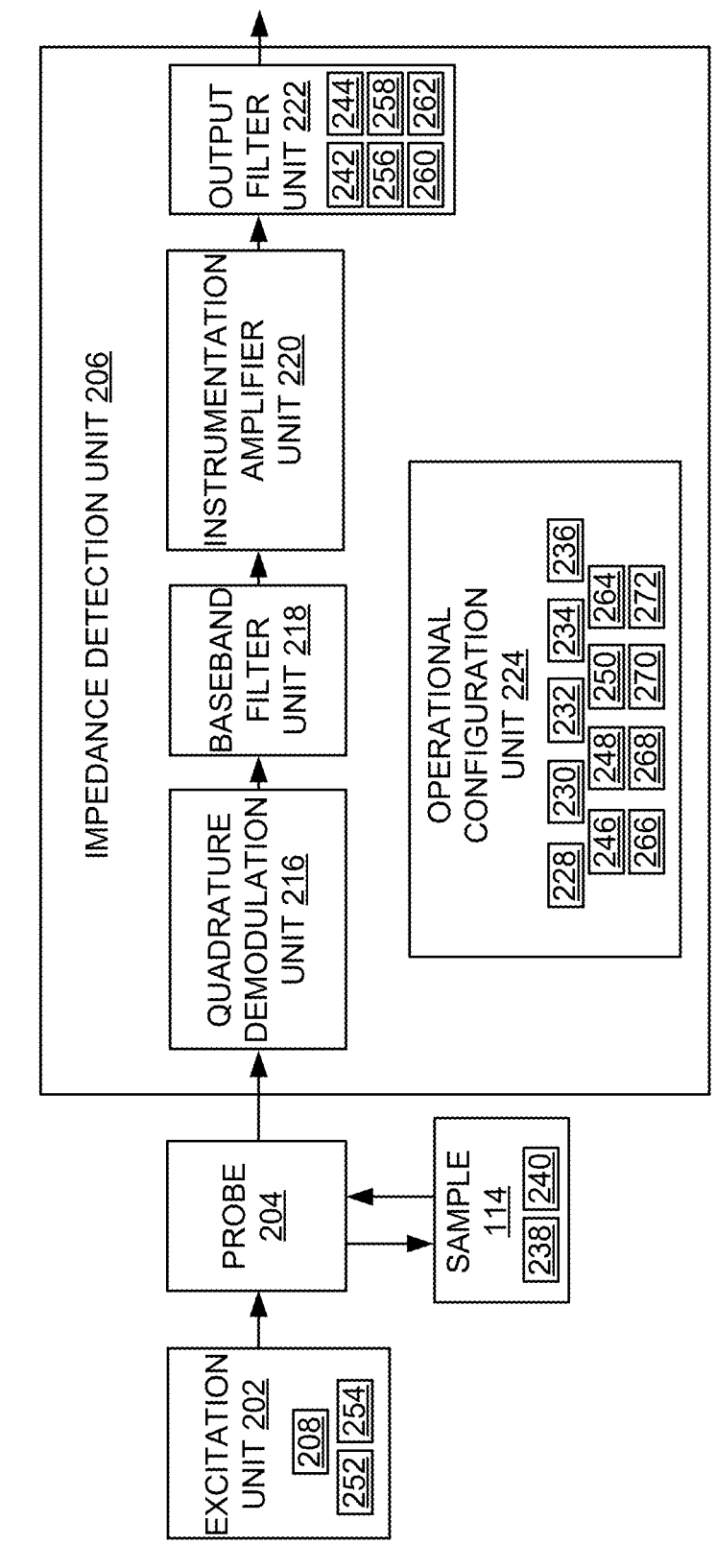
FIG. 2 is an example of a block diagram of the detection mechanism operating within the measurement system.

Referring now to FIG. 2, therein is shown an example of a block diagram of the detection mechanism 116 operating within the measurement system 100 of FIG. 1. The detection mechanism 116 can include an excitation unit 202, a probe 204, a sample 114, and an impedance detection unit 206 that are electrically or functionally coupled together for performing measurement operations. The detection mechanism 116 can implement real-time differential imaging modes in Scanning Microwave Impedance Microscopy, in which paired measurements at two controlled Z-positions are acquired and differenced in line.

By way of an example, the excitation unit 202 is an electronic module configured to generate a controlled microwave excitation 208 and to deliver the microwave excitation 208 to the probe 204. By way of an example, the probe 204 is a scanning probe assembly configured to apply the microwave excitation 208 to the sample 114 and to sense corresponding mechanical responses, microwave responses, or a combination thereof from tip-sample interaction. The probe 204 can include an AFM cantilever with a conductive or metal-coated tip.

By way of an example, the impedance detection unit 206 is a signal-processing module configured to receive mechanical responses, microwave responses, or a combination thereof from the probe 204 and to generate conditioned baseband channel voltages that represent impedance-related properties of the sample 114. The impedance detection unit 206 can include demodulation, filtering, amplification stages, or a combination thereof for generating conditioned baseband channel voltages.

The excitation unit 202 can generate a microwave excitation 208 and can supply the microwave excitation 208 to the probe 204. The probe 204 can apply the microwave excitation 208 to the sample 114 and can sense a corresponding mechanical response, electrical or microwave response, or a combination thereof produced by tip-sample interaction.

The impedance detection unit 206 can receive a mechanical or electrical response from the probe 204 and can convert the response into baseband voltages for display, storage, or analysis. The impedance detection unit 206 can coordinate with the excitation unit 202 so that timing and phase relationships are preserved across the measurement chain.

The impedance detection unit 206 can include a quadrature demodulation unit 216, a baseband filter unit 218, an instrumentation amplifier unit 220, an output filter unit 222, and an operational configuration unit 224. The probe 204 can include a conductive or metal-coated cantilever 226 that acts as a mechanical sensing element, an electrical path for the microwave excitation 208, or a combination thereof.

By way of an example, the quadrature demodulation unit 216 is a circuit configured to multiply the microwave response by phase-coherent reference signals to produce in-phase and quadrature (I/Q) baseband components (or equivalent capacitance/conductance channels) for further conditioning. By way of an example, the baseband filter unit 218 is a low-pass/anti-alias filter stage configured to remove the carrier and out-of-band noise from the demodulated components to yield baseband signals for downstream amplification and readout. By way of an example, the instrumentation amplifier unit 220 is a differential amplifier stage configured to set gain and common-mode rejection for the filtered baseband signals while preserving low-amplitude, small-signal variations above the system noise floor due to tip-sample impedance. The small-signal variations can refer to tiny changes in the voltage around a steady level that are big enough to rise above the instrument's noise level but not large enough to overdrive (clip) the electronics.

By way of an example, the output filter unit 222 is a selectable conditioning stage (e.g., DC or band-pass) configured to shape the amplified baseband signals into the desired readout mode for the channel voltages. By way of an example, the operational configuration unit 224 is a digital/control module configured to orchestrate scanning and timing, manage path and vertical-position setpoints and location pairing with a lateral tolerance, coordinate the excitation unit 202 and the impedance detection unit 206, command constant frequency/power settings, compute per-location voltage differences from the first and second channel voltages, or a combination thereof. By way of an example, the conductive cantilever 226 is a micro-mechanical beam with a conductive coating and tip that provides a mechanical force sensing and an electrical path to couple the microwave excitation 208 to the sample 114.

The conductive cantilever 226 can include a micro-mechanical beam used as the probe element in an atomic force microscope (AFM) or scanning microwave impedance microscopy (SMIM). The conductive cantilever 226 can include a sharp conductive tip formed at or near its free end and a thin metallic layer. For example, the conductive cantilever 226 can include a conductive material including gold (Au), platinum (Pt), titanium (Ti), or combinations thereof deposited on one or more surfaces of the cantilever body to provide electrical conductivity for the microwave excitation 208 and for signal detection as part of a first microwave response 238 and a second microwave response 240. The metal coating can allow the conductive cantilever 226 to act simultaneously as a mechanical force sensor and an electrical path between the excitation unit 202 and the sample 114. The conductive cantilever 226 can be shielded, partially shielded, or non-shielded.

For example, the conductive cantilever 226 includes a cantilever that provides an electrical conduction path (e.g., metal-coated, doped-silicon, or carbon-nanotube-coated). As an example, a shielded conductive cantilever 226 includes a coaxially shielded sMIM probe in which grounded metal layers (or a guard conductor) encase the signal conductor along the cantilever leaving a small aperture at the apex. As an example, a partially shielded conductive cantilever 226 includes designs with a ground plane or guard traces along portions of the beam that reduce but do not fully enclose stray fields. As an example, a non-shielded conductive cantilever 226 includes a conductive film on the beam/tip that provides the signal path without a surrounding grounded shield. In these examples, with fully shielded, partially shielded, or non-shielded conductive cantilevers 226, the impedance detection unit 206 acquires approached and lifted measurements and computes the per-location voltage difference to suppress background (including stray capacitance and slow drift) and emphasize tip-sample contrast.

In a specific example, the probe 204 can include an AFM conductive cantilever 226 having a sharp tip, e.g., tip radius <10 nano-meter (nm) or any other value, to enable high lateral resolution. The conductive cantilever 226 can flex slightly due to forces between the probe 204 tip and the sample 114, and this motion can be detected together with the electrical response. The probe 204 can deliver the first microwave response 238 and the second microwave response 240 to the impedance detection unit 206 for conversion into measurable voltages, e.g., a first channel voltage 242 and a second channel voltage 244. For example, this approach can enable the use of non-special conductive cantilevers 226 for quantitative SMIM because background and drift are removed by distance-synchronized subtraction rather than by specialized probe shielding or complex cancellation hardware.

By way of an example, the first microwave response 238 is a near-field microwave signal at the excitation frequency that the probe 204 senses from the sample 114 while the operational configuration unit 224 scans along the path 228 at the first vertical position 230, encoding amplitude and phase variations due to local tip-sample impedance. By way of an example, the second microwave response 240 is a near-field microwave signal sensed by the probe 204 from the sample 114 while the operational configuration unit 224 scans along the same path 228 at the second vertical position 232, capturing the impedance-dependent amplitude and phase at that lifted height.

By way of an example, the first channel voltage 242 is an impedance-representative output generated by the impedance detection unit 206 from the first microwave response 238, and can be an analog or digital baseband signal (e.g., I, Q, magnitude, phase, capacitance, conductance, or an equivalent metric) produced by any combination of detection, filtering, amplification, and/or conditioning stages, with DC and/or AC readout, implemented in hardware, software, or a combination thereof. The first channel voltage 242 can include a conditioned baseband output produced by the impedance detection unit 206 by demodulating the first microwave response 238 in the quadrature demodulation unit 216 with phase-coherent references synchronized to the microwave excitation 208, filtering in the baseband filter unit 218, amplifying in the instrumentation amplifier unit 220, and conditioning in the output filter unit 222 (DC or AC mode as configured) to represent an impedance-related channel (e.g., I, Q, capacitance, or conductance).

By way of an example, the second channel voltage 244 is an impedance-representative output generated by the impedance detection unit 206 from the second microwave response 240, and can be an analog or digital baseband signal (e.g., I, Q, magnitude, phase, capacitance, conductance, or an equivalent metric) produced by any combination of detection, filtering, amplification, and/or conditioning stages, with DC and/or AC readout, implemented in hardware, software, or a combination thereof. The second channel voltage 244 can include a conditioned baseband output produced by the impedance detection unit 206 from the second microwave response 240 via the same chain, including the quadrature demodulation unit 216→the baseband filter unit 218→the instrumentation amplifier unit 220→the output filter unit 222 (with DC or AC readout as configured) to represent the corresponding impedance-related channel for the second pass.

The operational configuration unit 224 can configure the probe 204 for scanning to perform controlled motion relative to the sample 114 along a path 228. By way of an example, the path 228 is a commanded lateral trajectory (e.g., a line or curve) across the sample 114 used to acquire data at known positions. The path 228 can include the line the tip follows across the surface of the sample 114.

The operational configuration unit 224 can set a first vertical position 230 for a first scan pass along the path 228. By way of an example, the first vertical position 230 is a Z-height setpoint (approached height) of the probe 204 relative to the sample 114 used while acquiring the first pass. The first vertical position 230 can indicate how high (or, in contact modes, how lightly) the tip is held above the surface of the sample 114 during the first pass. For the first scan pass along the path 228, the operational configuration unit 224 commands XY motion so the probe 204 follows the path 228 relative to the sample 114 while holding the Z setpoint at the first vertical position 230; the probe 204 captures measurements (e.g., the first microwave response 238), the impedance detection unit 206 generates corresponding voltages (e.g., the first channel voltage 242), and the operational configuration unit 224 indexes the data at first locations 234 along the path 228.

The operational configuration unit 224 can set a second vertical position 232 for a second scan pass along the same path 228. By way of an example, the second vertical position 232 is a Z-height setpoint (lifted height) of the probe 204 used while acquiring the second pass. The second scan can be performed in the same or the opposite direction as the first scan. For the second scan pass along the same path 228, the operational configuration unit 224 commands the probe 204 to repeat the motion along the same path 228 while holding the Z setpoint at the second vertical position 232; the probe 204 captures measurements (e.g., the second microwave response 240), the impedance detection unit 206 generates corresponding voltages (e.g., the second channel voltage 244), and the operational configuration unit 224 indexes the data at second locations 236 for later pairing within a lateral tolerance 248.

The operational configuration unit 224 can index data by position along the path 228 using a first location 234 for the first pass and a second location 236 for the second pass. By way of an example, the first location 234 and the second location 236 are XY indices laterally along the path 228 identifying where each measurement is taken. The first location 234 and the second location 236 can be the address of each measurement point along the line.

The probe 204 can capture a first microwave response 238 at the first vertical position 230 along the path 228 and can capture a second microwave response 240 at the second vertical position 232 along the same path 228. By way of an example, the first microwave response 238 and the second microwave response 240 are the microwave signals sensed at corresponding points during the first and second passes, respectively. The operational configuration unit 224 can time-align these responses with their locations including the first location 234 and the second location 236.

The quadrature demodulation unit 216 can process the first microwave response 238 to produce baseband components which, after conditioning through the baseband filter unit 218, the instrumentation amplifier unit 220, the output filter unit 222, or a combination thereof can form a first channel voltage 242. By way of an example, the first channel voltage 242 is a conditioned baseband voltage that represents at least one impedance-related property derived from the first microwave response 238.

The first microwave response 238 can be multiplied by phase-coherent in-phase and quadrature (I/Q) reference signals in the quadrature demodulation unit 216 to translate the signal from the microwave carrier to baseband; the baseband filter unit 218 can then low-pass filter the demodulated signal to remove residual components at the carrier and its sidebands, leaving only the slow-varying information. The instrumentation amplifier unit 220 can amplify the filtered signal to a usable level, i.e., a voltage range appropriate for accurate digitization and downstream processing without saturation or excessive noise and the output filter unit 222 can condition the amplified signal (DC or AC readout, as configured) to yield the first channel voltage 242. For example, the carrier is the high-frequency tone that carries the measurement information, and the usable level refers to the signal that is sufficiently large enough to measure reliably but not so large that the signal clips the electronics such that the electronics hit their voltage limits so the peaks of the signal are cut off (flattened), which distorts the waveform and makes the measurement inaccurate.

It has been discovered that when the operational configuration unit 224 synchronizes the excitation unit 202 and the impedance detection unit 206, the same detection path (216→218→220→222) can use the baseband DC offset as a signal rather than cancelling it. Using the DC term produced by coherent demodulation can reduce analog complexity, suppress drift from offset-cancellation networks, and increase quantitative stability. In practice, the DC offset can function as an in-situ power/health monitor for the microwave excitation 208 (based on the I/Q mixing in 216 and low-pass action in the baseband filter unit 218), while the conditioned output in the output filter unit 222 remains suitable for accurate digitization by keeping the level within the amplifier's non-clipping range.

The quadrature demodulation unit 216 can process the second microwave response 240 to generate a second channel voltage 244 via the baseband filter unit 218, the instrumentation amplifier unit 220, and the output filter unit 222. By way of an example, the second channel voltage 244 is a conditioned baseband voltage that represents at least one impedance-related property derived from the second microwave response 240. The second microwave response 240 can be demodulated, filtered, amplified, conditioned, or a combination thereof along the same chain used in the first microwave response 238 to yield the second channel voltage 244.

The operational configuration unit 224 can associate each first location 234 from the first pass with a corresponding second location 236 from the second pass using a lateral location 246 and a lateral tolerance 248. By way of an example, the lateral location 246 is the common XY coordinate used for pairing data across passes, and the lateral tolerance 248 is an allowable XY error window that still counts as the "same spot." This pairing can ensure that voltages compared between passes come from the same lateral point. The lateral tolerance 248 can be predefined (e.g., a fixed pixel offset, nanometers, or a percentage of the step size). The operational configuration unit 224 can pair measurements from the approached and lifted passes at the same lateral location 246 along the path 228 within a lateral tolerance 248 to compute per-location voltage differences.

The impedance detection unit 206 (e.g., via the operational configuration unit 224) can compute a voltage difference 250 between the first channel voltage 242 and the second channel voltage 244 for each paired lateral location 246. By way of an example, the voltage difference 250 is a per-location subtraction used to characterize the sample 114 by highlighting signal changes attributable to the change in vertical position. The voltage difference 250 can be generated by the first pass minus the second pass at the same spot to remove background and emphasize contrast.

The operational configuration unit 224 can command the excitation unit 202 to maintain a constant microwave frequency 252 and a constant microwave power 254 across both the first and second passes. By way of an example, the constant microwave frequency 252 is a fixed source frequency for the microwave excitation 208, and the constant microwave power 254 is a fixed output power level of the excitation unit 202 used across passes. Holding frequency and power constant can make pass-to-pass subtraction meaningful and stable.

It has been discovered that computing the voltage difference 250 at each lateral location 246, where the operational configuration unit 224 pairs the first channel voltage 242 and the second channel voltage 244 within the lateral tolerance 248 and the excitation unit 202 holds the constant microwave frequency 252 and constant microwave power 254, cancels stray background and slow drift in real-time and emphasizes near-field tip-sample contrast. Put simply, subtracting the lifted reading from the approached reading at the same spot removes what stays the same (parasitic and drift) and highlights what changes with height (local impedance), enabling high-SNR ΔSMIM across AFM probe mode 272, including off-resonance tapping 270 or contact.

The output filter unit 222 can be configured for DC or AC readout modes. In a DC mode, the chain (216→218→220→222) can yield a first direct-current (DC) voltage 256 for the first pass and a second direct-current (DC) voltage 258 for the second pass. By way of an example, the first DC voltage 256 and the second DC voltage 258 are low-frequency or near-zero-Hz outputs representing the demodulated magnitude/phase components at baseband. In an AC mode, the chain can yield a first alternating-current (AC) voltage 260 for the first pass and a second alternating-current (AC) voltage 262 for the second pass. By way of an example, the first AC voltage 260 and the second AC voltage 262 are modulated outputs at a known reference (e.g., scan-synchronous or dither) used when lock-in detection is configured. The voltage difference 250 can be computed from either the DC pair (256, 258) or the AC pair (260, 262), as configured. In a DC readout configuration, the first channel voltage 242 corresponds to the first DC voltage 256 and the second channel voltage 244 corresponds to the second DC voltage 258. In an AC readout configuration, the first channel voltage 242 corresponds to the first AC voltage 260 and the second channel voltage 244 corresponds to the second AC voltage 262.

The operational configuration unit 224 can set an AFM motion profile that includes a z-modulation cycle 264 with an approach portion 266 and a retract portion 268 in an AFM off-resonance tapping mode 270 or an AFM probe mode 272. By way of an example, the z-modulation cycle 264 is a repeated up-down motion of the probe 204; the approach portion 266 moves the tip of the probe 204 toward the surface of the sample 114, and the retract portion 268 moves the tip away; the AFM off-resonance tapping mode 270 is a low-frequency z-dither mode below cantilever resonance; and the AFM probe mode 272 is a selected AFM operating configuration such as contact, non-contact, or tapping. These settings can be used to specify whether the first microwave response 238 is captured during approach and the second microwave response 240 during retract, or vice versa. For example, dithering refers to a controlled periodic oscillation applied to the probe's Z-position to modulate the tip-sample interaction. The controlled periodic oscillation can be kept low in amplitude and frequency so it perturbs the contact lightly and avoids exciting the cantilever's resonance. The impedance detection unit 206 can compute the voltage difference 250 while operating in the AFM probe mode 272 with the conductive cantilever 226 (shielded, partially shielded, or non-shielded).

The impedance detection unit 206 can determine or compute the voltage difference 250 using processing resources of the first device 102, the second device 106, the detection mechanism 116 (e.g., via the operational configuration unit 224), or any combination thereof. The voltage difference 250 can be computed in hardware (analog/digital), in software (firmware/algorithms), or in any combination thereof and can be performed locally within the instrument of the first device 102 or distributed across networked resources including the second device 106. This flexibility can allow throughput, stability, and ease-of-use targets to be met across different system configurations.

The operational configuration unit 224 can include configuration registers, memories, or storage elements to store instrument settings, pairing parameters, etc. including the path 228, the first vertical position 230, the second vertical position 232, the first location 234, the second location 236, the lateral location 246, the lateral tolerance 248, parameters used to compute the voltage difference 250, the constant microwave frequency 252, the constant microwave power 254, the z-modulation cycle 264, the approach portion 266, the retract portion 268, the AFM off-resonance tapping mode 270, the AFM probe mode 272, readout mode selections associated with the first DC voltage 256, the second DC voltage 258, the first AC voltage 260, the second AC voltage 262, or a combination thereof. These registers or memories can provide configurations for other units including the excitation unit 202, the probe 204 (with scanner control), and sub-units of the impedance detection unit 206 including the quadrature demodulation unit 216, the baseband filter unit 218, the instrumentation amplifier unit 220, and the output filter unit 222. In this context, a register or memory can be a hardware or software location that stores a numeric setting used by the instrument (for example, a gain value, a frequency, or a positional setpoint).

For illustration, the configuration registers and memories are shown within the operational configuration unit 224, although they can be implemented in a different manner. As a specific example, configuration registers and memories can be implemented inside the excitation unit 202 (for the constant microwave frequency 252 and constant microwave power 254), inside the probe 204 or its scanner controller (for the path 228, first vertical position 230, second vertical position 232, z-modulation cycle 264, approach portion 266, retract portion 268, AFM off-resonance tapping mode 270, and AFM probe mode 272), and inside the quadrature demodulation unit 216, baseband filter unit 218, instrumentation amplifier unit 220, or output filter unit 222 (for channel selection and readout configuration associated with the first channel voltage 242, second channel voltage 244, first DC voltage 256, second DC voltage 258, first AC voltage 260, and second AC voltage 262). The operational configuration unit 224 can coordinate access to such distributed registers and memories so that each unit receives the correct settings during acquisition.

The impedance detection unit 206 can be implemented using resistor-capacitor (RC) circuit networks at one or more stages to realize time constants that set demodulation bandwidth, noise filtering, and output shaping. By way of an example, an RC network is a combination of resistors and capacitors that creates a time constant $\tau = R \times C$ used to establish a cutoff frequency, integrate or differentiate a signal, or introduce a controlled phase shift.

The quadrature demodulation unit 216 can include RC networks at the mixer outputs to form baseband smoothing/anti-alias filters and, in analog-reference embodiments, can include RC all-pass phase-shift networks to generate or trim the in-phase and 90-degree quadrature references. The mixing element (e.g., a chopper/switching mixer or analog multiplier) can be active, while the immediate post-mixer low-pass sections can be implemented with RC networks to remove residual carrier and high-frequency products before further conditioning.

The baseband filter unit 218 can be implemented with RC low-pass (single-pole or multi-pole) or band-pass networks to set the readout bandwidth. By way of an example, the cutoff frequency of the baseband filter unit 218 can be selected based on a reference or dither frequency commanded by the operational configuration unit 224, which selects R and/or C values (or their digitally controlled equivalents) so that $\tau = R \times C$ passes the desired modulation while rejecting out-of-band noise. In DC readout, the baseband filter unit 218 can function as an RC integrator/low-pass; in AC readout, the baseband filter unit 218 can be part of an RC band-pass centered near the modulation reference.

The instrumentation amplifier unit 220 can incorporate RC networks to define input bandwidth, provide input RC low-pass filtering for noise reduction, implement AC-coupling high-pass to reject DC offsets where desired, and provide compensation/stability shaping around the gain-setting network. While the core instrumentation amplifier gain can be set by precision resistors, adding capacitors across or in series with those resistors can create RC poles/zeros that control small-signal bandwidth and prevent saturation from out-of-band content.

The output filter unit 222 can be realized with RC networks to produce the final readout shaping for the channel voltages. In a DC readout configuration, the output filter unit 222 can provide additional RC low-pass smoothing to yield the first DC voltage 256 and the second DC voltage 258. In an AC readout configuration, the output filter unit 222 can implement an RC band-pass (or active RC topology) to yield the first AC voltage 260 and the second AC voltage 262 with a defined center frequency and quality factor suited to the lock-in reference.

The RC networks described in the quadrature demodulation unit 216, baseband filter unit 218, instrumentation amplifier unit 220, or output filter unit 222 can be implemented with discrete components, integrated on a printed-circuit board, embedded within an integrated circuit, or selected via digitally controlled resistor/capacitor arrays. The operational configuration unit 224 can store the associated filter and gain settings and can command the effective RC time constants so that the overall detection bandwidth matches the AFM/SMIM operating mode and modulation scheme.

The operational configuration unit 224 can establish relative lateral motion between the probe 204 and the sample 114, by driving an XY scanner of the probe 204 and/or an XY stage under the sample 114, so that the probe 204 scans the sample 114 along commanded line or raster paths (unidirectional or serpentine) with specified dwell, spacing, and speed. The operational configuration unit 224 can coordinate vertical positioning to execute a first pass at an approached height and a second pass at a lifted height, scanning along the same path to pair measurements, while synchronizing data acquisition by the excitation unit 202 and the impedance detection unit 206. The operational configuration unit 224 can further select and maintain a probe mode during scanning, including off-resonance tapping, contact (static), amplitude-modulated tapping (AM-AFM), frequency-modulated non-contact (FM-AFM), PeakForce tapping, contact-resonance AFM, and force-volume/fast-force mapping, and can implement a lift/hover second-pass rescan.

Figure 3:
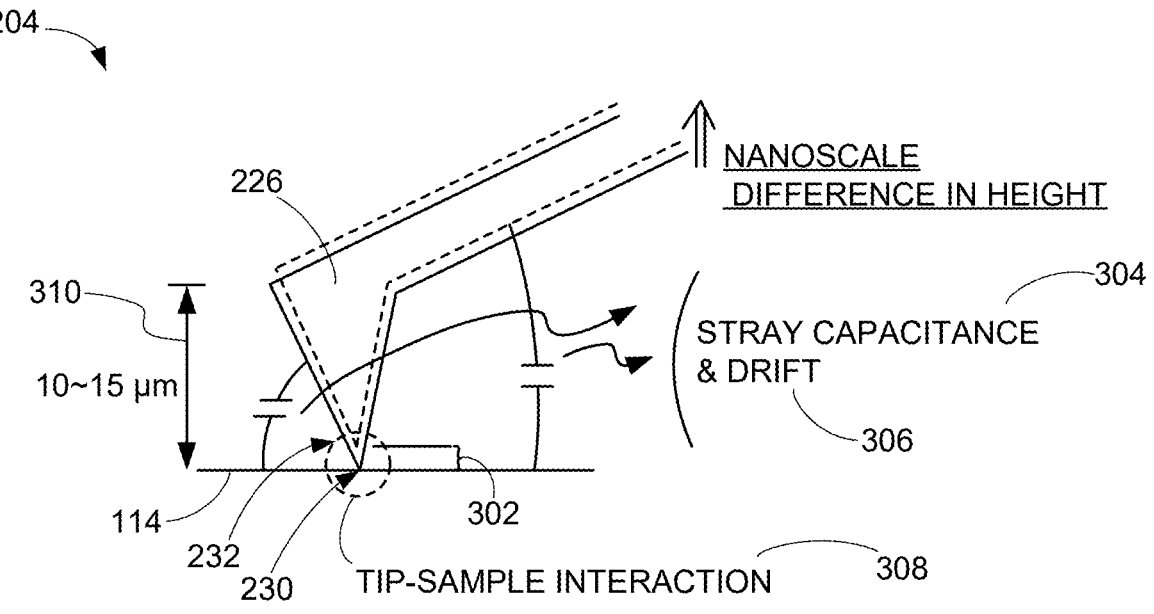
FIG. 3 is an example of a diagram of SMIM measurements performed at two different Z-positions relative to a sample.

Referring now to FIG. 3, therein is shown an example of a diagram of SMIM measurements performed at two different Z-positions relative to a sample 114. The operational configuration unit 224 can control and position the probe 204 at the first vertical position 230 and the second vertical position 232 along the path 228 of FIG. 2, establishing a height difference 302 between the two passes. By way of an example, the height difference 302 is a commanded change in tip-sample separation used to enable a differential SMIM measurement. The height difference 302 can be a commanded change in tip-sample separation in nanoscale or on the order of nanometers.

A relatively large clearance between the cantilever body and the sample 114, shown as a macroscale separation 310, e.g., approximately 10-15 micro-meters (μm). By way of an example, the macroscale separation 310 is a geometrical gap large enough that most parasitic field lines occur outside the immediate tip-sample near field. Because the macroscale separation 310 is large, a stray capacitance 304 between the cantilever body/holder and the sample 114 can change very little when the tip height varies by the height difference 302. By way of an example, the stray capacitance 304 is an unintended capacitive coupling outside the tip apex region that contributes a background component to the channel voltages.

Over the time used to acquire the two passes, the measurement can exhibit a drift 306. By way of an example, the drift 306 is a low-frequency baseline change in the first channel voltage 242 of FIG. 2, the second channel voltage 244 of FIG. 2, or a combination thereof (e.g., due to temperature or instrument drift) that changes so slowly that it is effectively approximately constant over the time between the first and second passes at a given lateral location (i.e., its time constant is longer than the interval between the passes).

It has been discovered that when the operational configuration unit 224 sets a nanoscale height difference 302 while maintaining a large macroscale separation 310, the stray capacitance 304 and drift 306 remain invariant between the two passes and therefore behave as common-mode background. This invariance allows the impedance detection unit 206 of FIG. 2 to treat those terms as nearly constant over the pass interval, setting up effective cancellation in the differential operation without environmental temperature control or additional analog cancellation circuitry.

The near-field interaction at the tip apex can vary strongly due to the height difference 302, denoted as a tip-sample interaction change 308. By way of an example, the tip-sample interaction change 308 is a change in local impedance at the apex of the conductive cantilever 226 caused by the nanometer-scale separation change immediately under the tip. The probe 204 can encode this effect in the first microwave response 238 of FIG. 2 at the first vertical position 230 and in the second microwave response 240 of FIG. 2 at the second vertical position 232, which the impedance detection unit 206 can convert to the first channel voltage 242 and the second channel voltage 244.

The operational configuration unit 224 can pair measurements from the two passes at a common lateral location 246 of FIG. 2 within a lateral tolerance 248 of FIG. 2, and the impedance detection unit 206 can compute the voltage difference 250 of FIG. 2 between the first channel voltage 242 and the second channel voltage 244 for each pair. Because the stray capacitance 304, the drift 306, or a combination thereof change little between the two heights (set by the height difference 302 within the same macroscale separation 310), their contributions can cancel in the voltage difference 250, while the tip-sample interaction change 308 remains emphasized to yield robust, background-reduced contrast. With the nanoscale height difference 302 between the approached and lifted passes, the local tip-sample interaction change 308 can vary strongly, whereas the background terms, including stray capacitance 304, slow drift 306, or a combination thereof, change very little and remain effectively constant over the interval.

It has been discovered that pairing each first and second pass measurement at the same lateral location 246 within the lateral tolerance 248 and then differencing in the impedance detection unit 206 emphasizes the local near-field, i.e., the tip-sample interaction change 308, while suppressing background from stray capacitance 304 and drift 306. This per-location subtraction markedly improves signal-to-noise ratio and quantitative stability across varying topography because the operational configuration unit 224 indexes and time-aligns the two readings before subtraction.

Figure 4:
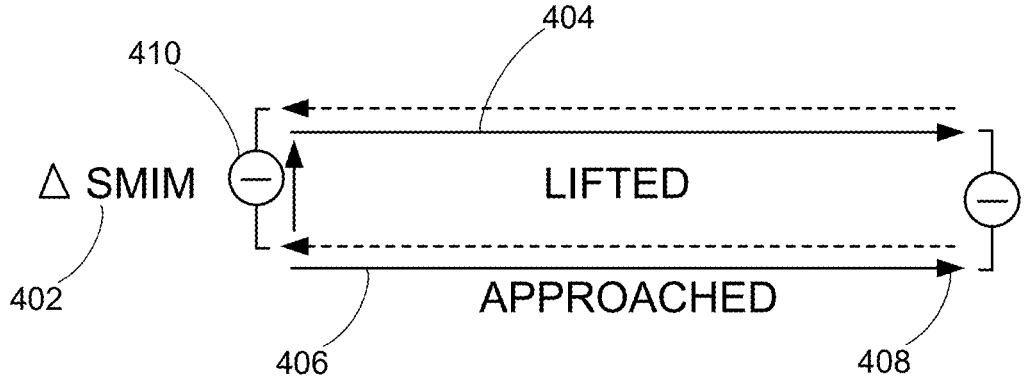
FIG. 4 is an example of a differential lift-mode diagram for the measurement system.

Referring now to FIG. 4, therein is shown an example of a differential lift-mode diagram for the measurement system 100. The operational configuration unit 224 of FIG. 2 can command two passes along the path 228 of FIG. 2: a first pass at the first vertical position 230 of FIG. 2 (approached) and a second pass at the second vertical position 232 of FIG. 2 (lifted). The impedance detection unit 206 of FIG. 2 (e.g., via operational configuration unit 224) can compute the voltage difference 250 at each lateral location 246 of FIG. 2. This result is depicted as a SMIM differential 402 (ΔSMIM). By way of an example, the SMIM differential 402 is a visualization or dataset corresponding to the voltage difference 250 computed from paired first and second channel voltages for each location along the path 228.

For illustration, two scan traces are shown: a lifted-pass trace 404 and an approached-pass trace 406. By way of an example, the lifted-pass trace 404 is the spatial profile of the second channel voltage 244 of FIG. 2 measured while the probe 204 of FIG. 2 is at the second vertical position 232, and the approached-pass trace 406 is the spatial profile of the first channel voltage 242 of FIG. 2 measured while the probe 204 is at the first vertical position 230. The second pass can be executed in the same direction or in the opposite direction relative to the first pass, and the pairing logic in the operational configuration unit 224 can align corresponding locations before differencing.

A scan-direction indicator 408 is shown to denote that either left-to-right or right-to-left scans can be used for one or both passes. By way of an example, the scan-direction indicator 408 is an arrow annotation identifying the commanded direction of motion for a given pass; the pairing and differencing are direction-independent because they use the lateral location 246 as the common index.

It has been discovered that when the operational configuration unit 224 uses the lateral location 246 as the pairing index, the subtraction operator 410 can produce the same SMIM differential 402 regardless of the scan order or direction of the two passes. Because the operational configuration unit 224 aligns the lifted-pass trace 404 and the approached-pass trace 406 at identical lateral locations within the lateral tolerance 248 of FIG. 2, reversal-dependent artifacts from scanner hysteresis, creep, or speed variation can be suppressed, improving repeatability and quantitative stability.

The subtraction symbols in FIG. 4 represent a subtraction operator 410. By way of an example, the subtraction operator 410 is a functional block (e.g., implemented in the operational configuration unit 224) that forms the voltage difference 250 by subtracting the approached-pass trace 406 from the lifted-pass trace 404 at each paired lateral location 246 within the lateral tolerance 248. The subtraction operator 410 uses the two channel-voltage values indexed to the same lateral location to compute a per-location difference.

The nanoscale height change between passes can correspond to the height difference 302 of FIG. 3. As described with stray capacitance 304 of FIG. 3, slow drift 306 of FIG. 3, and macroscale separation 310 in FIG. 3, background and drift contributions can remain constant over the short interval between passes and therefore can cancel in the voltage difference 250; the local near-field response (e.g., the tip-sample interaction change 308 of FIG. 3) can appear with increased contrast in the voltage difference 250 since the local near-field response contributes more strongly than the slowly varying background terms including the stray capacitance 304 and slow drift 306, which are largely canceled. The SMIM differential 402 can thus provide a background-reduced contrast map that is robust to slow drift and parasitic.

The operational configuration unit 224 can store configuration settings that select whether the SMIM differential 402 is computed from DC readout (including first DC voltage 256 of FIG. 2 and second DC voltage 258 of FIG. 2) or AC readout (including first AC voltage 260 of FIG. 2 and second AC voltage 262 of FIG. 2). In DC mode, the first channel voltage 242 corresponds to the first DC voltage 256 and the second channel voltage 244 corresponds to the second DC voltage 258; in AC mode, the first channel voltage 242 corresponds to the first AC voltage 260 and the second channel voltage 244 corresponds to the second AC voltage 262. The subtraction operator 410 can use the selected pair accordingly.

It has been discovered that performing the per-location subtraction in line, while the second pass is being acquired, allows the impedance detection unit 206 to stream the SMIM differential 402 in real-time, yielding background-reduced contrast without offline post-processing. Under constant microwave frequency 252 of FIG. 2 and constant microwave power 254 of FIG. 2, the subtraction operator 410 cancels common-mode stray capacitance 304 and slow drift 306 and emphasize the tip-sample interaction change 308. This behavior persists for either DC readout (first/second DC voltages 256, 258) or AC readout (first/second AC voltages 260, 262), enabling fast, high-SNR ΔSMIM imaging with standard conductive cantilevers 226 and relaxed environmental control. Because the subtraction operator 410 cancels slow thermal and electronic drift and uses a common detection path, the measurement system 100 operates without environmental temperature control and does not require extra post-processing to obtain quantitative contrast.

Figure 5:
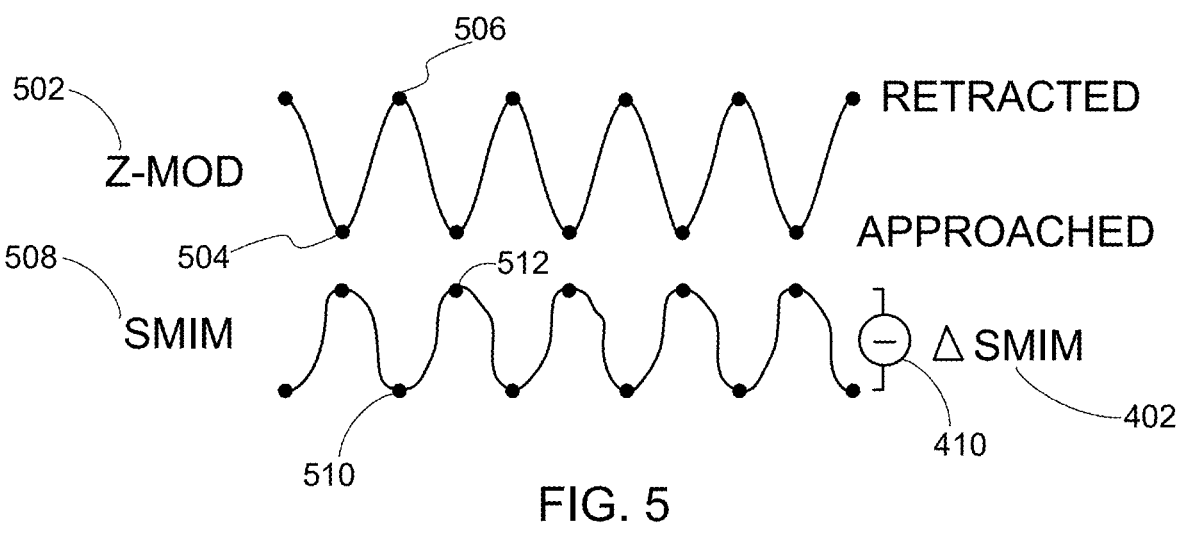
FIG. 5 is an example of a differential off-resonance tapping diagram for the measurement system.

Referring now to FIG. 5, therein is shown an example of a differential off-resonance tapping diagram for the measurement system 100. The operational configuration unit 224 of FIG. 2 can operate the probe 204 of FIG. 2 in the AFM off-resonance tapping mode 270 of FIG. 2 while the probe 204 executes the z-modulation cycle 264 of FIG. 2. The vertical motion versus time is depicted as a z-modulation waveform 502. By way of an example, the z-modulation waveform 502 is a periodic trace of the commanded Z-position of the probe 204 below the cantilever resonance frequency. The troughs of the waveform correspond to the first vertical position 230 of FIG. 2 (approached) and the peaks correspond to the second vertical position 232 of FIG. 2 (retracted).

The operational configuration unit 224 can select sampling instants on the z-modulation waveform 502, indicated as approached sample markers 504 and retracted sample markers 506. By way of an example, the approached sample markers 504 are the times at which the probe 204 is at the first vertical position 230, and the retracted sample markers 506 are the times at which the probe 204 is at the second vertical position 232. The operational configuration unit 224 can monitor the z-modulation waveform 502 and trigger measurements at its minima and maxima, or the operational configuration unit 224 can phase-lock to a dither reference, including a copy of the Z-modulation timing signal that marks the 'tip-closest' and 'tip-farthest' phases, and trigger at those phases, yielding a matched approached/retracted pair each cycle. The approached and retracted sampling described here can implement a distance-synchronized differential measurement, in which readings at defined Z-phases of the z-modulation cycle 264 are paired and subtracted each cycle to produce ΔSMIM 402 in real-time.

The impedance detection unit 206 of FIG. 2 can measure a time-series of the channel voltage while the z-modulation cycle 264 runs; this is shown as an SMIM waveform 508. By way of an example, the SMIM waveform 508 is the evolving first channel voltage 242 or second channel voltage 244 as a function of time during the z-modulation cycle 264. Samples taken at the approached sample markers 504 form an approached SMIM sample sequence 510, and samples taken at the retracted sample markers 506 form a retracted SMIM sample sequence 512. By way of an example, the approached SMIM sample sequence 510 and the retracted SMIM sample sequence 512 are two synchronized sequences of channel-voltage values captured at the first vertical position 230 and the second vertical position 232, respectively.

The operational configuration unit 224 can pair each value in the approached SMIM sample sequence 510 with the temporally corresponding value in the retracted SMIM sample sequence 512 for the same z-modulation cycle 264 and the same lateral location 246 of FIG. 2 within the lateral tolerance 248 of FIG. 2. The subtraction operator 410 (e.g., executed in operational configuration unit 224) can form the voltage difference 250 of FIG. 2 for every pair to produce the SMIM differential 402 (ΔSMIM). The subtraction operator 410 subtracts the sample 114 of FIG. 1 captured at the second vertical position 232 from the sample 114 captured at the first vertical position 230 for the same cycle and location, thereby canceling common-mode background while emphasizing the near-field contrast.

It has been discovered that forming the voltage difference 250 per z-modulation cycle using spatially indexed pairs at the same lateral location 246 within the lateral tolerance 248 allows the impedance detection unit 206 (via the subtraction operator 410) to stream the SMIM differential 402 in real-time. Subtracting the retracted reading from the approached reading at the same spot and in the same cycle cancels what remains constant over the cycle (parasitic and drift) and highlights the near-field contrast that follows the tip-sample interaction.

This differential off-resonance tapping operation can mitigate slow drift and parasitic contributions that vary little over one z-modulation period, while increasing the visibility of changes that follow the tip-sample interaction. The z-modulation waveform 502 marks when the tip is close (approached) and farther away (retracted), the SMIM waveform 508 shows how the signal changes over time, and the paired subtraction yields ΔSMIM 402 for robust, background-reduced contrast. In this off-resonance tapping configuration, common-mode terms including stray capacitance 304 of FIG. 3 and drift 306 of FIG. 3 remain nearly constant over one z-modulation period and therefore cancel in the per-cycle subtraction.

Figure 6:
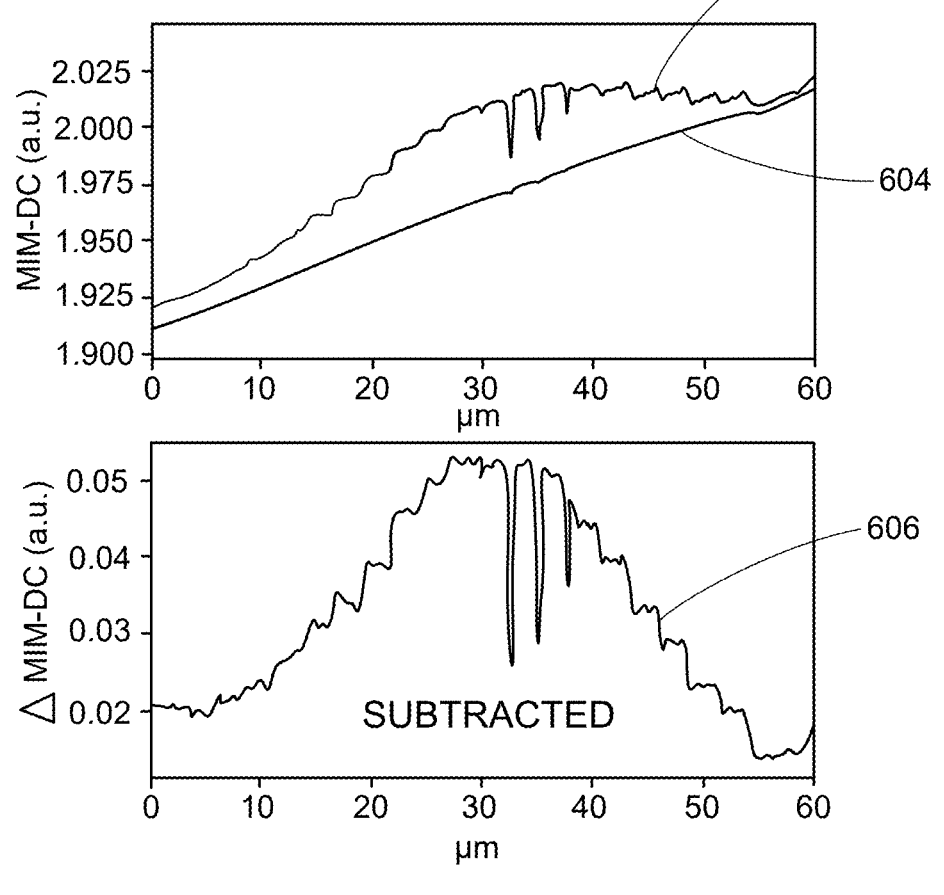
FIG. 6 is an example of a simulated differential SMIM measurement for the sample configured as a semiconductor doping reference.

Referring now to FIG. 6, therein is shown an example of a simulated differential SMIM measurement for the sample 114 of FIG. 1 configured as a semiconductor doping reference. The operational configuration unit 224 of FIG. 2 can command a scan along the path 228 of FIG. 2 while the excitation unit 202 of FIG. 2 maintains the constant microwave frequency 252 of FIG. 2, the constant microwave power 254 of FIG. 2, or a combination thereof. The impedance detection unit 206 of FIG. 2 can operate in a DC readout mode (216 of FIG. 2→218 of FIG. 2→220 of FIG. 2→222 of FIG. 2) so that each pass produces a spatial profile of the DC channel voltage along the path 228.

For illustration, the upper plot shows an approached DC trace 602 and a lifted DC trace 604. By way of an example, the approached DC trace 602 is the spatial profile of the first DC voltage 256 of FIG. 2 measured at the first vertical position 230 of FIG. 2 along the path 228. By way of an example, the lifted DC trace 604 is the spatial profile of the second DC voltage 258 of FIG. 2 measured at the second vertical position 232 of FIG. 2 along the same path 228. The lifted DC trace 604 can represent background contributions including the stray capacitance 304 of FIG. 3, the slow drift 306 of FIG. 3, or a combination thereof, which change little over the short interval between passes.

For illustration, the lower plot shows a differential DC profile 606 (ΔMIM-DC) produced by the subtraction operator 410 of FIG. 4. By way of an example, the differential DC profile 606 is a per-location difference formed by subtracting the second-pass value (second DC voltage 258) from the first-pass value (first DC voltage 256) at the same lateral location 246 of FIG. 2 within the lateral tolerance 248 of FIG. 2. The operational configuration unit 224 pairs samples by their common lateral location 246 and supplies the paired values to the subtraction operator 410, which computes the voltage difference 250 of FIG. 2 to generate the differential DC profile 606.

Peaks and dips that stand out clearly from the local baseline, i.e., exceeding a configurable threshold above noise and slow drift, in the differential DC profile 606 can indicate the doping-reference signatures. By way of an example, the doping-reference signatures are localized features in ΔMIM-DC that correspond to changes in local electrical properties (e.g., doping level or junction boundaries) of the semiconductor reference embodied by the sample 114. Because the background terms including stray capacitance 304, slow drift 306, or a combination thereof are similar in both passes, the background terms can largely cancel in the voltage difference 250, while near-field variations tied to the tip-sample interaction change 308 of FIG. 3 remain with increased contrast in the differential DC profile 606. The approached DC trace 602 captures near-field contrast and background, the lifted DC trace 604 captures mostly background, and the paired subtraction yields the differential DC profile 606 that highlights the semiconductor features (doping-reference signatures) along the scan path 228.

It has been discovered that pairing by lateral location 246 and differencing to produce the differential DC profile 606 allows the operational configuration unit 224 to apply a configurable detection criterion (e.g., a threshold above noise and drift) and label doping-reference signatures in real-time. Under the same constant-source conditions (252, 254) and DC readout path (216→218→220→222), the subtraction operator 410 emphasizes the local tip-sample response while suppressing common-mode background, improving quantitative stability and sensitivity to semiconductor features along the path 228. In AC-modulated/tapping SMIM and per-pixel approach-hold-retract spectroscopy, the distance-synchronized ΔSMIM of one or more embodiments of the present invention provides higher SNR on samples 114 where tapping alone is SNR-limited (e.g., highly doped P/N semiconductors), performs automatic background subtraction during imaging, and avoids per-pixel cube acquisition that can lead to 3~10 times slower imaging times relative to other AFM modes.

For illustration, the vertical axes labeled "MIM-DC (a.u.)" and "ΔMIM-DC (a.u.)" use "a.u." to mean "arbitrary units." In this context, the plotted values can be the channel voltages after instrument gain/offset and normalization, so their absolute numbers are instrument-dependent, while their relative changes along the path 228 carry the contrast. The subtraction that forms the voltage difference 250 can cancel constant offsets, so ΔMIM-DC in a.u. reflects the per-location change up to a constant scale factor. Arbitrary units in the graphs show shape and relative size, not a fixed physical unit like volts or ohms; a calibration can later convert the arbitrary units to physical units if applicable (e.g., using coefficients stored/managed by the operational configuration unit 224).

Figure 7:
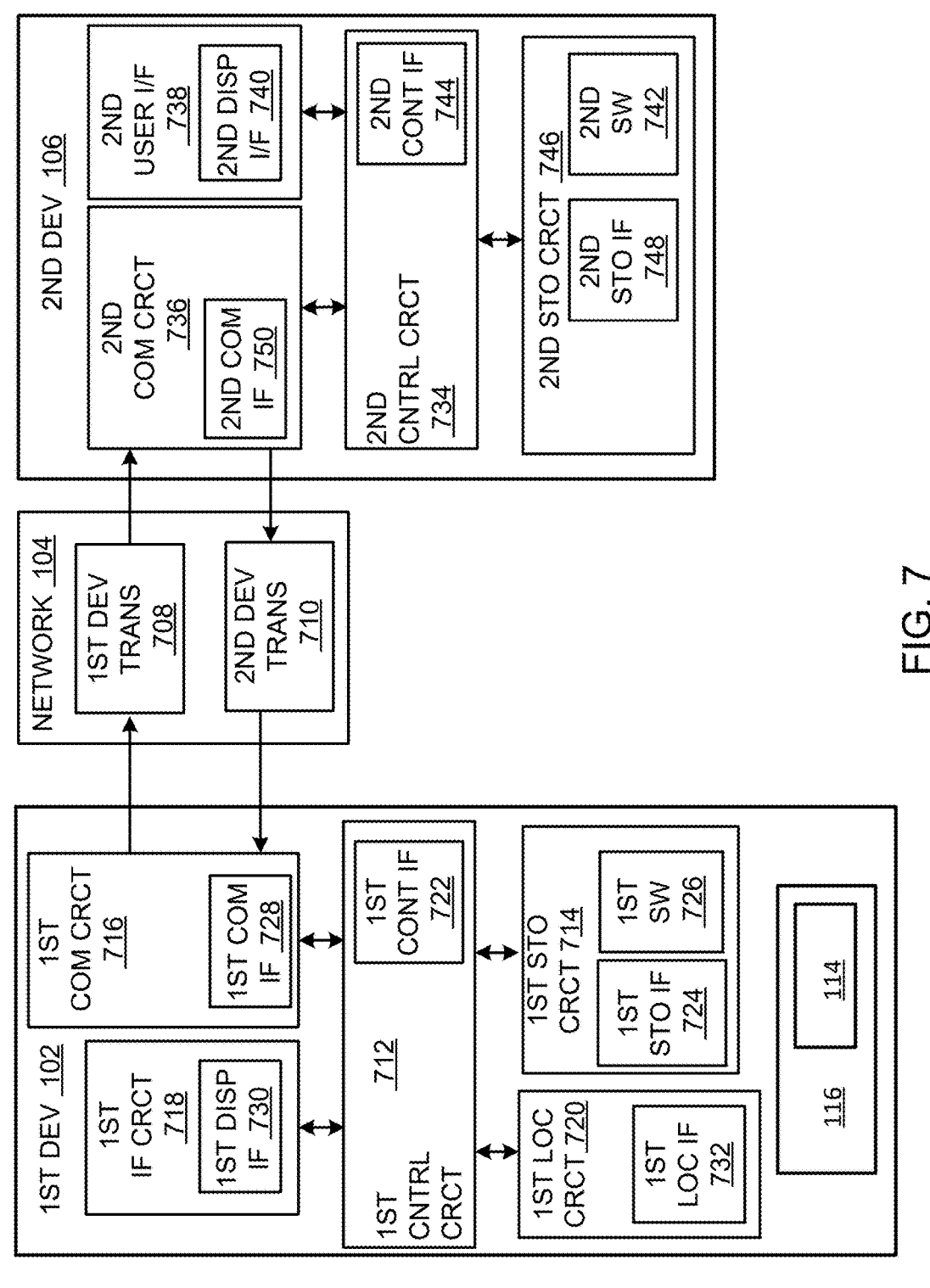
FIG. 7 is an exemplary block diagram of the measurement system in an embodiment.

Referring now to FIG. 7, therein is shown an exemplary block diagram of the measurement system 100 in an embodiment. The measurement system 100, a portion of the measurement system 100, or a combination thereof can execute the detection mechanism 116 of FIG. 1. The measurement system 100 can include the first device 102, the network 104, and the second device 106. The first device 102 can send information in a first device transmission 708 over the network 104 to the second device 106. The second device 106 can send information in a second device transmission 710 over the network 104 to the first device 102.

For illustrative purposes, the measurement system 100 is shown with the first device 102 as a client device, although it is understood that the measurement system 100 can include the first device 102 as a different type of device.

Also, for illustrative purposes, the measurement system 100 is shown with the second device 106 as a server, although it is understood that the measurement system 100 can include the second device 106 as a different type of device. For example, the second device 106 can be a client device. By way of an example, the measurement system 100 can be implemented entirely on the first device 102 with some functions of the detection mechanism 116 executed by a first control circuit 712.

Also, for illustrative purposes, the measurement system 100 is shown with interaction between the first device 102 and the second device 106. However, it is understood that the first device 102 can be a part of or the entirety of a tablet computer, a smart phone, or a combination thereof. Similarly, the second device 106 can similarly interact with the first device 102 representing the tablet computer, the smart phone, or a combination thereof. For example, the measurement system 100 can operate an atomic force microscope (AFM) including a SMIM module, in which the first device 102 controls probe motion and signal acquisition and the second device 106 performs impedance mapping or image reconstruction.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include the first control circuit 712, a first storage circuit 714, a first communication circuit 716, a first interface circuit 718, and a first location circuit 720. The first control circuit 712 can include a first control interface 722. The first control circuit 712 can execute a first software 726 to provide the intelligence of the measurement system 100. The first control circuit 712 can execute portions of the operational configuration unit 224 of FIG. 2 as software/firmware, including commanding the path 228 of FIG. 2, the first vertical position 230 of FIG. 2, or the second vertical position 232 of FIG. 2, indexing the first location 234 of FIG. 2 or the second location 236 of FIG. 2, time-aligning the first microwave response 238 of FIG. 2 or the second microwave response 240 of FIG. 2, or a combination thereof.

The first control circuit 712 can be implemented in a number of different manners. For example, the first control circuit 712 can be a processor, an application specific integrated circuit (ASIC), an embedded processor, a microprocessor, a hardware control logic, a hardware finite state machine (FSM), a digital signal processor (DSP), or a combination thereof. The first control interface 722 can be used for communication between the first control circuit 712 and other functional units or circuits in the first device 102. The first control interface 722 can also be used for communication that is external to the first device 102. The first control circuit 712 can process information associated with the sample 114 and execute portions of the detection mechanism 116.

The first control interface 722 can receive information from the other functional units/circuits or from external sources, or can transmit information to the other functional units/circuits or to external destinations. The external sources and the external destinations refer to sources and destinations external to the first device 102. The first control circuit 712 can generate and synchronize drive waveforms for the AFM scanner and the microwave excitation unit 202 of FIG. 2 and can receive feedback signals including cantilever deflection and SMIM baseband voltages. The first control circuit 712 can command constant microwave frequency 252 of FIG. 2 or constant microwave power 254 of FIG. 2 in the excitation unit 202 of FIG. 2 during both passes to stabilize the voltage difference 250 of FIG. 2.

The first control interface 722 can be implemented in different ways and can include different implementations depending on which functional units/circuits or external units/circuits are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, cantilever deflection sensor, piezoelectric scanner control, microwave circuitry, or a combination thereof.

The first storage circuit 714 can store the first software 726. The first storage circuit 714 can also store the relevant information, such as data representing incoming samples 114, the detection mechanism 116 and the other embodiments, or a combination thereof.

The first storage circuit 714 can be a volatile memory, a nonvolatile memory, an internal memory, an external memory, or a combination thereof. For example, the first storage circuit 714 can be a nonvolatile storage such as non-volatile random-access memory (NVRAM), Flash memory, disk storage, or a volatile storage such as static random-access memory (SRAM).

The first storage circuit 714 can include a first storage interface 724. The first storage interface 724 can be used for communication between the first storage circuit 714 and other functional units or circuits in the first device 102. The first storage interface 724 can also be used for communication that is external to the first device 102.

The first storage interface 724 can receive information from the other functional units/circuits or from external sources, or can transmit information to the other functional units/circuits or to external destinations. The external sources and the external destinations refer to sources and destinations external to the first device 102. The first storage interface 724 can receive input from and source data to the detection mechanism 116.

The first storage interface 724 can include different implementations depending on which functional units/circuits or external units/circuits are being interfaced with the first storage circuit 714. The first storage interface 724 can be implemented with technologies and techniques similar to the implementation of the first control interface 722. The first storage circuit 714 can store AFM height data, SMIM impedance spectra, or combined datasets for later analysis or calibration.

The first communication circuit 716 can enable external communication to and from the first device 102. For example, the first communication circuit 716 can permit the first device 102 to communicate with the second device 106 and the network 104. The first communication circuit 716 can interact with the second device 106 for implementing the detection mechanism 116.

The first communication circuit 716 can also function as a communication hub allowing the first device 102 to function as part of the network 104 and not limited to be an endpoint or terminal circuit to the network 104. The first communication circuit 716 can include active and passive components, such as microelectronics or an antenna, for interaction with the network 104. The first communication circuit 716 can relay real-time AFM tip-position and SMIM signal data to the second device 106 for image formation.

The first communication circuit 716 can include a first communication interface 728. The first communication interface 728 can be used for communication between the first communication circuit 716 and other functional units or circuits in the first device 102. The first communication interface 728 can receive information from the second device 106 for distribution to the other functional units/circuits or can transmit information to the other functional units or circuits.

The first communication interface 728 can include different implementations depending on which functional units or circuits are being interfaced with the first communication circuit 716. The first communication interface 728 can be implemented with technologies and techniques similar to the implementation of the first control interface 722.

The first interface circuit 718 allows the user 112 of FIG. 1 to interface and interact with the first device 102. The first interface circuit 718 can include an input device and an output device. Examples of the input device of the first interface circuit 718 can include a keypad, a touchpad, soft-keys, a keyboard, a microphone, a camera, an infrared sensor for receiving remote signals, or any combination thereof to provide data and communication inputs, such as the sample 114. The first interface circuit 718 can receive the sample 114 provided by the user 112 that can be manipulated by the first control circuit 712. The first interface circuit 718 can allow the user 112 to select scan regions, adjust probe-sample distance, and display SMIM amplitude or phase images.

The first interface circuit 718 can include a first display interface 730. The first display interface 730 can include an output device. The first display interface 730 can include a projector, a video screen, a touch screen, a speaker, a microphone, a keyboard, and combinations thereof. The first display interface 730 can allow the user 112 to view the results of the detection mechanism 116 and the other embodiments on the output device.

The first control circuit 712 can operate the first interface circuit 718 to display information generated by the measurement system 100 and receive input from the user 112. The first control circuit 712 can also execute the first software 726 for the other functions of the measurement system 100, including receiving location information from the first location circuit 720. The first control circuit 712 can further execute the first software 726 for interaction with the network 104 via the first communication circuit 716. The first control circuit 712 can operate portions or all of the detection mechanism 116.

The first control circuit 712 can also receive location information from the first location circuit 720. The first control circuit 712 can operate the detection mechanism 116 or portions thereof. The first control circuit 712 can operate on information associated with the sample 114, as well as any of the output for the detection mechanism 116 and any of the embodiments for display to the user 112.

The first location circuit 720 can be implemented in many ways. For example, the first location circuit 720 can function as at least a part of the global positioning system, an inertial compute system, a cellular-tower location system, a gyroscope, or any combination thereof. Also, for example, the first location circuit 720 can utilize components such as an accelerometer, gyroscope, or global positioning system (GPS) receiver.

The first location circuit 720 can include a first location interface 732. The first location interface 732 can be used for communication between the first location circuit 720 and other functional units or circuits in the first device 102.

The first location interface 732 can receive information from the other functional units/circuits or from external sources, or can transmit information to the other functional units/circuits or to external destinations. The external sources and the external destinations refer to sources and destinations external to the first device 102. The first location interface 732 can receive the global positioning location from the global positioning system (not shown).

The first location interface 732 can include different implementations depending on which functional units/circuits or external units/circuits are being interfaced with the first location circuit 720. The first location interface 732 can be implemented with technologies and techniques similar to the implementation of the first control circuit 712.

The second device 106 can be optimized for implementing an embodiment of the present invention in a multiple device embodiment with the first device 102. The second device 106 can provide the additional or higher performance processing power compared to the first device 102. The second device 106 can include a second control circuit 734, a second communication circuit 736, a second user interface 738, and a second storage circuit 746.

The second user interface 738 allows an operator (not shown) to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or a combination thereof.

The second control circuit 734 can execute a second software 742 to provide the intelligence of the second device 106 of the measurement system 100. The second software 742 can operate in conjunction with the first software 726.

The second control circuit 734 can provide additional performance compared to the first control circuit 712. The second control circuit 734 can execute instructions to implement all or some of the functions of the detection mechanism 116. The second control circuit 734 can execute portions of the operational configuration unit 224 of FIG. 2 to perform pairing by lateral location 246 of FIG. 2 within lateral tolerance 248 of FIG. 2 and compute the voltage difference 250 of FIG. 2 (e.g., the SMIM differential 402 of FIG. 4), and to apply detection criteria for doping-reference signatures when applicable.

The second control circuit 734 can operate the second user interface 738 to display information. The second control circuit 734 can also execute the second software 742 for the other functions of the measurement system 100, including operating the second communication circuit 736 to communicate with the first device 102 over the network 104.

The second control circuit 734 can be implemented in a number of different manners. For example, the second control circuit 734 can be a processor, an embedded processor, a microprocessor, hardware control logic, a hardware finite state machine (FSM), a digital signal processor (DSP), or a combination thereof.

The second control circuit 734 can include a second control interface 744. The second control interface 744 can be used for communication between the second control circuit 734 and other functional units or circuits in the second device 106. The second control interface 744 can also be used for communication that is external to the second device 106.

The second control interface 744 can receive information from the other functional units/circuits or from external sources, or can transmit information to the other functional units/circuits or to external destinations. The external sources and the external destinations refer to sources and destinations external to the second device 106.

The second control interface 744 can be implemented in different ways and can include different implementations depending on which functional units/circuits or external units/circuits are being interfaced with the second control interface 744. For example, the second control interface 744 can be implemented with a pressure sensor, an inertial sensor, a microelectromechanical system (MEMS), optical circuitry, waveguides, wireless circuitry, wireline circuitry, or a combination thereof.

The second storage circuit 746 can store the second software 742. The second storage circuit 746 can also store the information such as data representing incoming sample 114, data representing, including but not limited to sound files, or a combination thereof. The second storage circuit 746 can be sized to provide the additional storage capacity to supplement the first storage circuit 714.

For illustrative purposes, the second storage circuit 746 is shown as a single element, although it is understood that the second storage circuit 746 can be a distribution of storage elements. Also, for illustrative purposes, the measurement system 100 is shown with the second storage circuit 746 as a single hierarchy storage system, although it is understood that the measurement system 100 can include the second storage circuit 746 in a different configuration. For example, the second storage circuit 746 can be formed with different storage technologies forming a memory hierarchal system including different levels of caching, main memory, rotating media, or off-line storage.

The second storage circuit 746 can be a controller of a volatile memory, a nonvolatile memory, an internal memory, an external memory, or a combination thereof. For example, the second storage circuit 746 can be a controller of a nonvolatile storage such as non-volatile random-access memory (NVRAM), Flash memory, disk storage, or a volatile storage such as static random access memory (SRAM). The second storage circuit 746 can store AFM topography maps, SMIM amplitude and phase data, and derived property maps including conductivity or permittivity.

The second storage interface 748 can receive information from the other functional units/circuits or from external sources, or can transmit information to the other functional units/circuits or to external destinations. The external sources and the external destinations refer to sources and destinations external to the second device 106.

The second storage interface 748 can include different implementations depending on which functional units/circuits or external units/circuits are being interfaced with the second storage circuit 746. The second storage interface 748 can be implemented with technologies and techniques similar to the implementation of the second control interface 744.

The second communication circuit 736 can enable external communication to and from the second device 106. For example, the second communication circuit 736 can permit the second device 106 to communicate with the first device 102 over the network 104.

The second communication circuit 736 can also function as a communication hub allowing the second device 106 to function as part of the network 104 and not limited to be an endpoint or terminal unit or circuit to the network 104. The second communication circuit 736 can include active and passive components, such as microelectronics or an antenna, for interaction with the network 104.

The second communication circuit 736 can include a second communication interface 750. The second communication interface 750 can be used for communication between the second communication circuit 736 and other functional units or circuits in the second device 106. The second communication interface 750 can receive information from the other functional units/circuits or can transmit information to the other functional units or circuits.

The second communication interface 750 can include different implementations depending on which functional units or circuits are being interfaced with the second communication circuit 736. The second communication interface 750 can be implemented with technologies and techniques similar to the implementation of the second control interface 744. The second communication circuit 736 can support remote microscope monitoring and cloud-based data processing for AFM/SMIM imaging.

The second communication circuit 736 can couple with the network 104 to send information to the first device 102. The first device 102 can receive information in the first communication circuit 716 from the second device transmission 710 of the network 104. The measurement system 100 can be executed by the first control circuit 712, the second control circuit 734, or a combination thereof. For illustrative purposes, the second device 106 is shown with the partition including the second user interface 738, the second storage circuit 746, the second control circuit 734, and the second communication circuit 736, although it is understood that the second device 106 can include a different partition. For example, the second software 742 can be partitioned differently such that some or all of its function can be in the second control circuit 734 and the second communication circuit 736. Also, the second device 106 can include other functional units or circuits not shown in FIG. 7 for clarity. As an example for tight timing, the first control circuit 712 can execute time-critical portions of 224 of FIG. 2 (triggering at Z-cycle phases, index stamping), while the second control circuit 734 can execute compute-intensive portions (pairing within the lateral tolerance 248 of FIG. 2, the voltage difference 250 of FIG. 2, and generating the SMIM differential 402 of FIG. 4).

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

The functional units or circuits described above can be implemented in hardware. For example, one or more of the functional units or circuits can be implemented using a gate array, an application specific integrated circuit (ASIC), circuitry, a processor, a computer, integrated circuit, integrated circuit cores, a pressure sensor, an inertial sensor, a microelectromechanical system (MEMS), a passive device, a physical non-transitory memory medium including instructions for performing the software function of the detection mechanism 116, a portion therein, or a combination thereof.

For illustrative purposes, the measurement system 100 is described by operation of the first device 102 and the second device 106. It is understood that the first device 102 and the second device 106 can operate any of the modules or units and functions of the measurement system 100 including a distribution of the functions of the detection mechanism 116. For example, the modules or units include the AFM scanner control, SMIM excitation and detection electronics, the image-processing software, or a combination thereof.

Figure 8:
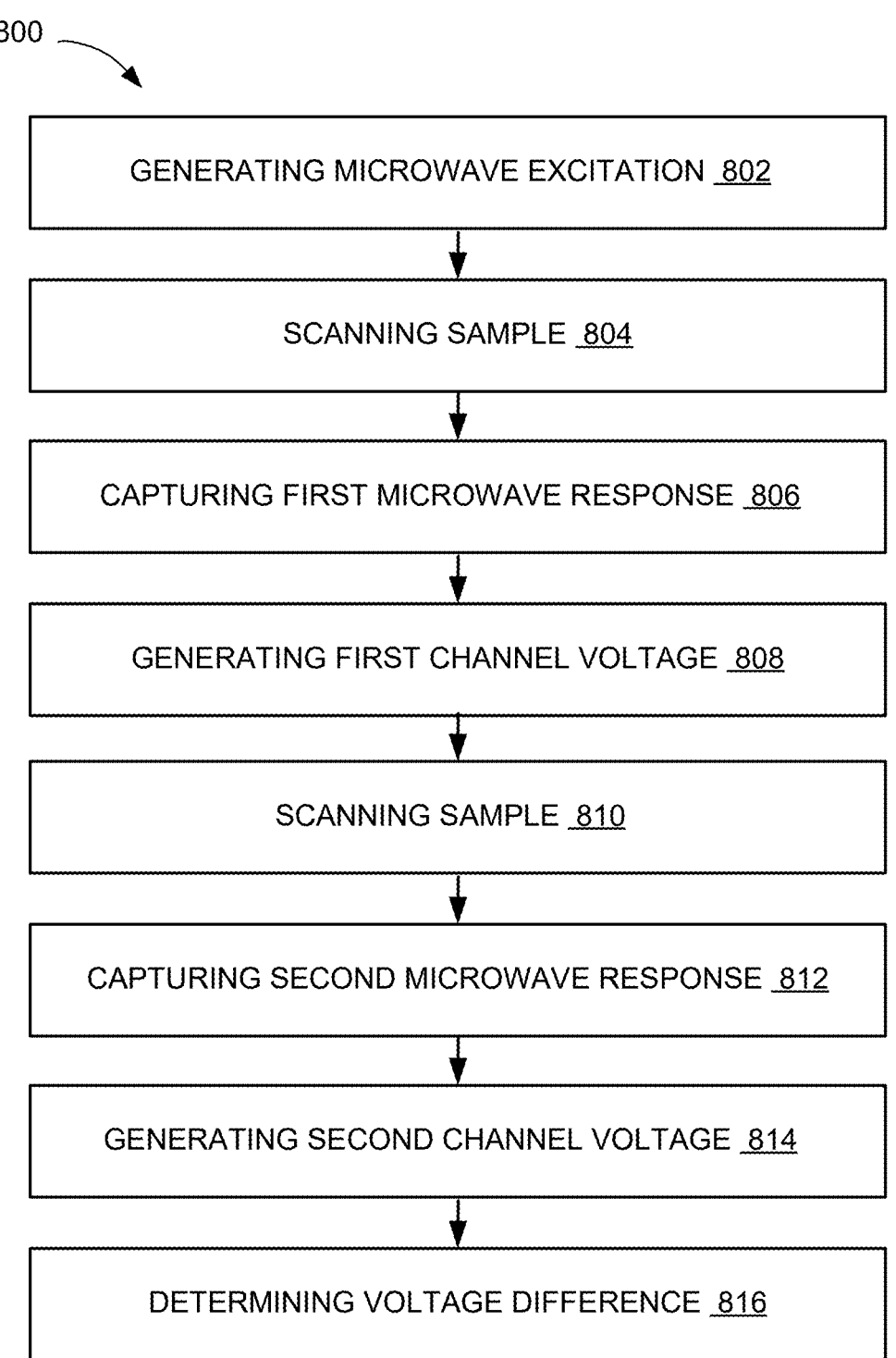
FIG. 8 is a flow chart of a method of operation of a measurement system in an embodiment of the present invention.

Referring now to FIG. 8, therein is shown a flow chart of a method 800 of operation of a measurement system 100 of FIG. 1 in an embodiment of the present invention. The method 800 includes: generating a microwave excitation towards a sample in a block 802; scanning the sample along a path at a first vertical position relative to the sample in a block 804; capturing a first microwave response along the path at the first vertical position based on the microwave excitation in a block 806; generating a first channel voltage based on the first microwave response in a block 808; scanning the sample along the path at a second vertical position relative to the sample in a block 810; capturing a second microwave response along the path at the second vertical position based on the microwave excitation in a block 812; generating a second channel voltage based on the second microwave response in a block 814; and determining a voltage difference between the first channel voltage based on the first vertical position and the second channel voltage based on the second vertical position for characterizing the sample in a block 816.

One or more embodiments provide an AFM system with a SMIM module that implements real-time differential imaging modes in scanning microwave impedance microscopy. It has been discovered that executing two passes along the same path, including an approached pass at a first vertical position and a lifted pass at a second vertical position, then pairing the per-location channel voltages and subtracting them (ΔSMIM) cancels stray-capacitance background and slow drift in real-time, enabling high-SNR, quantitative SMIM imaging in contact and off-resonance tapping without specialized environmental control or offline post-processing;

the approach also works with standard metal-coated canti-levers. This discovery addresses limitations of other AFM modes (e.g., AC-modulated/tapping SMIM and DataCube-style per-pixel spectroscopy that perform post-acquisition background subtraction and can be 3-10× slower). By con-trast, ΔSMIM in one or more embodiments of the present invention provides fast, automatic, stray-free and drift-free imaging during acquisition.

The resulting method, process, apparatus, device, product, and/or system is straightforward, cost-effective, uncompli-cated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the tech-nology to at least the next level.

While the invention has been described in conjunction with a specific best mode, it is to be understood that many alternatives, modifications, and variations will be apparent to those skilled in the art in light of the foregoing descrip-tion. Accordingly, it is intended to embrace all such alter-natives, modifications, and variations that fall within the scope of the included claims. All matters set forth herein or shown in the accompanying drawings are to be interpreted in an illustrative and non-limiting sense.

What is claimed is:

1. A measurement system comprising:
   an excitation unit configured to generate a microwave excitation towards a sample;
   a probe, coupled to the excitation unit, configured to:
      scan the sample along a path at a first vertical position relative to the sample,
      capture a first microwave response along the path at the first vertical position based on the microwave exci-tation,
      scan the sample along the path at a second vertical position relative to the sample, and
      capture a second microwave response along the path at the second vertical position based on the microwave excitation; and
   an impedance detection unit, coupled to the probe, con-figured to:
      generate a first channel voltage based on the first microwave response, and
      generate a second channel voltage based on the second microwave response for determining a voltage dif-ference between the first channel voltage based on the first vertical position and the second channel voltage based on the second vertical position for characterizing the sample.

2. The measurement system as claimed in claim 1 wherein the probe is configured to:
   capture the first microwave response relative to a first location along the path based on the microwave exci-tation; and
   capture the second microwave response relative to a second location along the path based on the microwave excitation for determining the voltage difference between the first channel voltage and the second chan-nel voltage based on the first location and the second location corresponding to a lateral location along the path within a lateral tolerance.

3. The measurement system as claimed in claim 1 wherein:
   the excitation unit is configured to generate the micro-wave excitation at a constant microwave frequency, a constant microwave power, or a combination thereof; and
   the probe is configured to:
      scan the sample along the path at the first vertical position relative to the sample based on the micro-wave excitation at the constant microwave fre-quency, the constant microwave power, or a combi-nation thereof, and
      scan the sample along the path at the second vertical position relative to the sample based on the micro-wave excitation at the constant microwave fre-quency, the constant microwave power, or a combi-nation thereof.

4. The measurement system as claimed in claim 1 wherein the impedance detection unit is configured to:
   generate the first channel voltage by generating a first direct-current (DC) voltage based on the first micro-wave response; and
   generate the second channel voltage by generating a second direct-current (DC) voltage based on the second microwave response for determining the voltage dif-ference between the first DC voltage based on the first vertical position and the second DC voltage based on the second vertical position for characterizing the sample.

5. The measurement system as claimed in claim 1 wherein the impedance detection unit is configured to:
   generate the first channel voltage by generating a first alternating-current (AC) voltage based on the first microwave response; and
   generate the second channel voltage by generating a second alternating-current (AC) voltage based on the second microwave response for determining the volt-age difference between the first AC voltage based on the first vertical position and the second AC voltage based on the second vertical position for characterizing the sample.

6. The measurement system as claimed in claim 1 wherein the probe is configured to:
   capture the first microwave response in an approach portion of a z-modulation cycle in an atomic force microscope (AFM) off-resonance tapping mode; and
   capture the second microwave response in a retract por-tion of the z-modulation cycle in the AFM off-reso-nance tapping mode.

7. The measurement system as claimed in claim 1 wherein the probe is configured to capture, with a conductive can-tilever, the first microwave response along the path at the first vertical position based on the microwave excitation, where the conductive cantilever is shielded, partially shielded, or non-shielded for determining the voltage dif-ference between the first channel voltage based on the first vertical position and the second channel voltage based on the second vertical position in an AFM probe mode with the conductive cantilever.

8. A method of operation of a measurement system comprising:
   generating a microwave excitation towards a sample;
   scanning the sample along a path at a first vertical position relative to the sample;
   capturing a first microwave response along the path at the first vertical position based on the microwave excita-tion;

generating a first channel voltage based on the first microwave response;

scanning the sample along the path at a second vertical position relative to the sample;

capturing a second microwave response along the path at the second vertical position based on the microwave excitation;

generating a second channel voltage based on the second microwave response; and determining a voltage difference between the first channel voltage based on the first vertical position and the second channel voltage based on the second vertical position for characterizing the sample.

9. The method as claimed in claim 8 wherein:

capturing the first microwave response includes capturing the first microwave response relative to a first location along the path based on the microwave excitation;

capturing the second microwave response includes capturing the second microwave response relative to a second location along the path based on the microwave excitation; and determining the voltage difference includes determining the voltage difference between the first channel voltage and the second channel voltage based on the first location and the second location corresponding to a lateral location along the path within a lateral tolerance.

10. The method as claimed in claim 8 wherein:

generating the microwave excitation includes generating the microwave excitation at a constant microwave frequency, a constant microwave power, or a combination thereof;

scanning the sample along the path at the first vertical position includes scanning the sample along the path at the first vertical position relative to the sample based on the microwave excitation at the constant microwave frequency, the constant microwave power, or a combination thereof; and scanning the sample along the path at the second vertical position includes scanning the sample along the path at the second vertical position relative to the sample based on the microwave excitation at the constant microwave frequency, the constant microwave power, or a combination thereof.

11. The method as claimed in claim 8 wherein:

generating the first channel voltage includes generating a first direct-current (DC) voltage based on the first microwave response;

generating the second channel voltage includes generating a second direct-current (DC) voltage based on the second microwave response; and determining the voltage difference includes determining the voltage difference between the first DC voltage based on the first vertical position and the second DC voltage based on the second vertical position for characterizing the sample.

12. The method as claimed in claim 8 wherein:

generating the first channel voltage includes generating a first alternating-current (AC) voltage based on the first microwave response;

generating the second channel voltage includes generating a second alternating-current (AC) voltage based on the second microwave response; and determining the voltage difference includes determining the voltage difference between the first AC voltage based on the first vertical position and the second AC voltage based on the second vertical position for characterizing the sample.

13. The method as claimed in claim 8 wherein:

capturing the first microwave response includes capturing the first microwave response in an approach portion of a z-modulation cycle in an atomic force microscope (AFM) off-resonance tapping mode; and capturing the second microwave response includes capturing the second microwave response in a retract portion of the z-modulation cycle in the AFM off-resonance tapping mode.

14. The method as claimed in claim 8 wherein:

capturing the first microwave response includes capturing, with a conductive cantilever, the first microwave response along the path at the first vertical position based on the microwave excitation, where the conductive cantilever is shielded, partially shielded, or non-shielded; and determining the voltage difference includes determining the voltage difference between the first channel voltage based on the first vertical position and the second channel voltage based on the second vertical position in an AFM probe mode with the conductive cantilever.

15. A non-transitory computer-readable medium storing an instruction that, when executed by a control circuit of a measurement system, causes the control circuit to perform functions comprising:

generating a microwave excitation towards a sample;

scanning the sample along a path at a first vertical position relative to the sample;

capturing a first microwave response along the path at the first vertical position based on the microwave excitation;

generating a first channel voltage based on the first microwave response;

scanning the sample along the path at a second vertical position relative to the sample;

capturing a second microwave response along the path at the second vertical position based on the microwave excitation;

generating a second channel voltage based on the second microwave response; and determining a voltage difference between the first channel voltage based on the first vertical position and the second channel voltage based on the second vertical position for characterizing the sample.

16. The non-transitory computer-readable medium as claimed in claim 15 wherein:

capturing the first microwave response includes capturing the first microwave response relative to a first location along the path based on the microwave excitation;

capturing the second microwave response includes capturing the second microwave response relative to a second location along the path based on the microwave excitation; and determining the voltage difference includes determining the voltage difference between the first channel voltage and the second channel voltage based on the first location and the second location corresponding to a lateral location along the path within a lateral tolerance.

17. The non-transitory computer-readable medium as claimed in claim 15 wherein:

generating the microwave excitation includes generating the microwave excitation at a constant microwave frequency, a constant microwave power, or a combination thereof;

scanning the sample along the path at the first vertical position includes scanning the sample along the path at the first vertical position relative to the sample based on the microwave excitation at the constant microwave frequency, the constant microwave power, or a combination thereof; and scanning the sample along the path at the second vertical position includes scanning the sample along the path at the second vertical position relative to the sample based on the microwave excitation at the constant microwave frequency, the constant microwave power, or a combination thereof.

18. The non-transitory computer-readable medium as claimed in claim 15 wherein:

generating the first channel voltage includes generating a first direct-current (DC) voltage based on the first microwave response;

generating the second channel voltage includes generating a second direct-current (DC) voltage based on the second microwave response; and determining the voltage difference includes determining the voltage difference between the first DC voltage based on the first vertical position and the second DC voltage based on the second vertical position for characterizing the sample.

19. The non-transitory computer-readable medium as claimed in claim 15 wherein:

generating the first channel voltage includes generating a first alternating-current (AC) voltage based on the first microwave response;

generating the second channel voltage includes generating a second alternating-current (AC) voltage based on the second microwave response; and determining the voltage difference includes determining the voltage difference between the first AC voltage based on the first vertical position and the second AC voltage based on the second vertical position for characterizing the sample.

20. The non-transitory computer-readable medium as claimed in claim 15 wherein:

capturing the first microwave response includes capturing the first microwave response in an approach portion of a z-modulation cycle in an atomic force microscope (AFM) off-resonance tapping mode; and capturing the second microwave response includes capturing the second microwave response in a retract portion of the z-modulation cycle in the AFM off-resonance tapping mode.

* * * * *